US012056537B2

(12) United States Patent
Vergara et al.

(10) Patent No.: US 12,056,537 B2
(45) Date of Patent: Aug. 6, 2024

(54) MANAGING EXECUTION OF CONTINUOUS DELIVERY PIPELINES FOR A CLOUD PLATFORM BASED DATA CENTER

(71) Applicant: Salesforce, Inc., San Francisco, CA (US)

(72) Inventors: Jeaneth Aguilar Vergara, Granite Bay, CA (US); Arifullah Khan Pattan, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 487 days.

(21) Appl. No.: 17/382,192

(22) Filed: Jul. 21, 2021

(65) Prior Publication Data

US 2023/0035486 A1 Feb. 2, 2023

(51) Int. Cl.
*G06F 9/50* (2006.01)
*G06F 9/30* (2018.01)

(52) U.S. Cl.
CPC ........ *G06F 9/5072* (2013.01); *G06F 9/30069* (2013.01); *G06F 9/30123* (2013.01)

(58) Field of Classification Search
CPC .................................................. G06F 9/5072
See application file for complete search history.

(56) References Cited

U.S. PATENT DOCUMENTS 10,671,368 B2 * 6/2020 Brealey ............... G06F 11/3688
11,392,366 B1 * 7/2022 Wiegley .................. H04L 67/34

OTHER PUBLICATIONS

Burns, E., "Why Spinnaker matters to CI/CD," Aug. 27, 2019, seven pages, [Online] [Retrieved on Jan. 19, 2021] Retrieved from the Internet <URL: https://opensource.com/article/19/8/why-spinnaker-matters-cicd>.
Mukherjee, J., "What is a continuous delivery pipeline?" Date Unknown, 14 pages, [Online] [Retrieved on Jan. 19, 2021] Retrieved from the Internet <URL: https://www.atlassian.com/continuous-delivery/pipeline>.
Thakur, V., "Continuous Delivery Pipeline for Kubernetes Using Spinnaker," May 27, 2020, 21 pages, [Online] [Retrieved on Jan. 19, 2021] Retrieved from the Internet <URL: https://www.metricfire.com/blog/continuous-delivery-pipeline-for-kubernetes-using-spinnaker/?GAID=undefined&GAID=undefined>.

* cited by examiner

*Primary Examiner* — Charlie Sun
(74) *Attorney, Agent, or Firm* — Kwan & Olynick LLP

(57) ABSTRACT

Computing systems, for example, multi-tenant systems deploy software artifacts in data centers created in a cloud platform using a cloud platform infrastructure language that is cloud platform independent. The system generates pipelines for deploying software artifacts in data center entities configured in a cloud platform. The system allows partial execution of pipelines such that the pipeline can be executed again to complete execution of the remaining stages. The system maintains state of the pipeline execution and checks the state to determine whether a stage should be executed during subsequent executions. The system allows a failed stage to be retried multiple times based on a retry strategy. A retry strategy may depend on the data center entity in a hierarchy of data venter entities of a data center.

19 Claims, 26 Drawing Sheets

700

Generating one or more datacenters based on a cloud platform independent declarative specification of a data center
710

↓

Generating a cloud platform independent master deployment pipeline for different environment
720

↓

Receiving customizations to logic for promotion of artifact from one stage to next
730

↓

Compiling the deployment pipeline to generate detailed cloud platform specific deployment pipeline
740

↓

Receiving code for releasing a feature on the target cloud platform
750

↓

Executing the cloud platform specific deployment pipeline to deploy software artifacts using the generated pipeline
760

Generating one or more datacenters based on a cloud platform independent declarative specification of a data center
1310

↓

Receiving deployment version map
1320

↓

Receiving a cloud platform independent master deployment pipeline
1330

↓

Compiling the deployment pipeline to generate cloud platform specific deployment pipeline
1340

↓

Receiving code for releasing a feature on the target cloud platform
1350

↓

Executing the cloud platform specific deployment pipeline to deploy software artifacts based on the received code
1360

```
Receiving a pipeline for deploying software
artifacts on a cloud platform
1510
```

Repeating for states of the pipeline

```
Selecting a stage of the pipeline
1520

Determining a context for the stage based
on inputs of the stage
1530

Accessing execution status of the stage
from the state store
1540

Determining based on the execution status
whether to skip state or select as candidate
stage for execution
1550

Execute stage if stage selected as a
candidate stage for execution
1560
```

FIG. 15

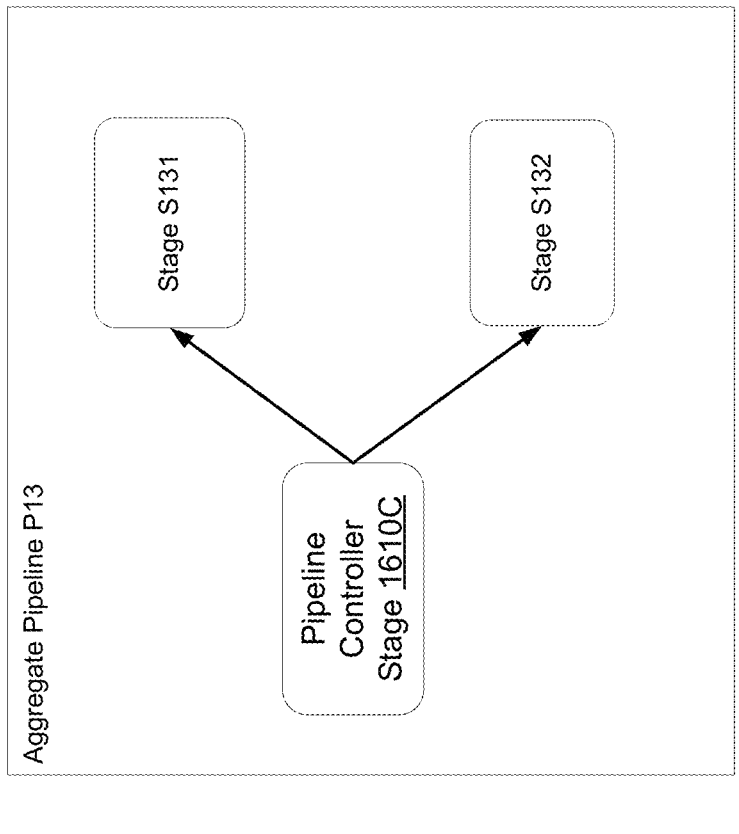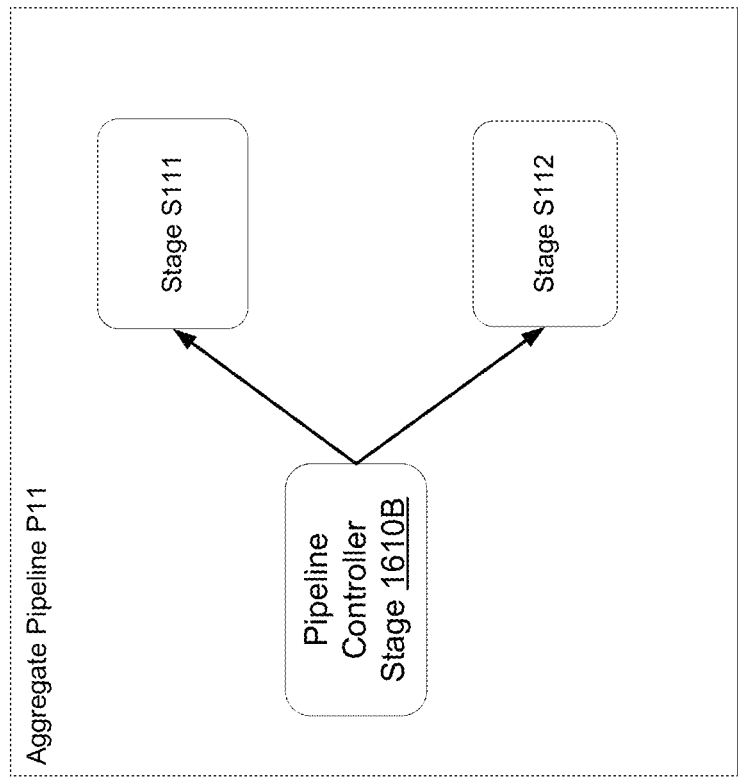
FIG. 16C

MANAGING EXECUTION OF CONTINUOUS DELIVERY PIPELINES FOR A CLOUD PLATFORM BASED DATA CENTER

BACKGROUND

Field of Art

This disclosure relates in general to management of software releases in cloud computing platforms, and in particular to execution of continuous delivery pipelines for data centers configured in cloud computing platforms.

Description of the Related Art

Organizations are increasingly replying on cloud platforms (or cloud computing platforms) such as AWS (AMAZON WEB SERVICES), GOOGLE cloud platform, MICROSOFT AZURE, and so on for their infrastructure needs. Cloud platforms provide servers, storage, databases, networking, software, and so on over the internet to organizations. Conventionally, organizations maintained data centers that house hardware and software used by the organization. However, maintaining data centers can result in significant overhead in terms of maintenance, personnel, and so on. As a result, organizations are shifting their data centers to cloud platforms that provide scalability and elasticity of computing resources.

Organizations maintain cloud infrastructure on cloud platforms using continuous delivery platforms that can manage and deploy applications on cloud platforms. Such continuous delivery platforms allow organizations to simplify software deployment process and manage applications, firewalls, clusters, servers, load balancers, and other computing infrastructure on the cloud platform. However, deploying software releases for services provided on a cloud platform using a continuous delivery platform can be complex. For example, different versions of software may have to be deployed on different services running on different cloud computing resources. Furthermore, each cloud platform uses different tools for managing the resources.

A large system such as a multi-tenant system typically manages services for a large number of organizations representing tenants of the multi-tenant system and may interact with multiple cloud platforms. A multi-tenant system may have to maintain several thousand such data centers on a cloud platform. Each data center may have different requirements for software releases. Continuous delivery of software artifacts for such systems involves complex execution pipelines. A failure in such a complex pipeline typically requires manual restart of the pipeline or significant portions of the pipeline. Managing such complex pipeline requires experts with knowledge of the data center and system configurations. Furthermore, manual restart of the execution pipeline results in significant delays in the delivery of the software artifacts as well as waste of computing resources resulting from repeated execution of the pipeline.

BRIEF DESCRIPTION OF DRAWINGS

FIG. 7 shows the overall process for generating pipelines for deployment of software artifacts on data centers configured on a cloud platform according to an embodiment.

FIG. 13 shows the overall process for deployment of software artifacts on data centers configured on a cloud platform according to an embodiment.

FIG. 15 shows the process for implementing idempotency during execution of a pipeline according to an embodiment.

FIG. 16A-D show an example data center configuration and corresponding generated pipelines according to an embodiment.

Figure 1:
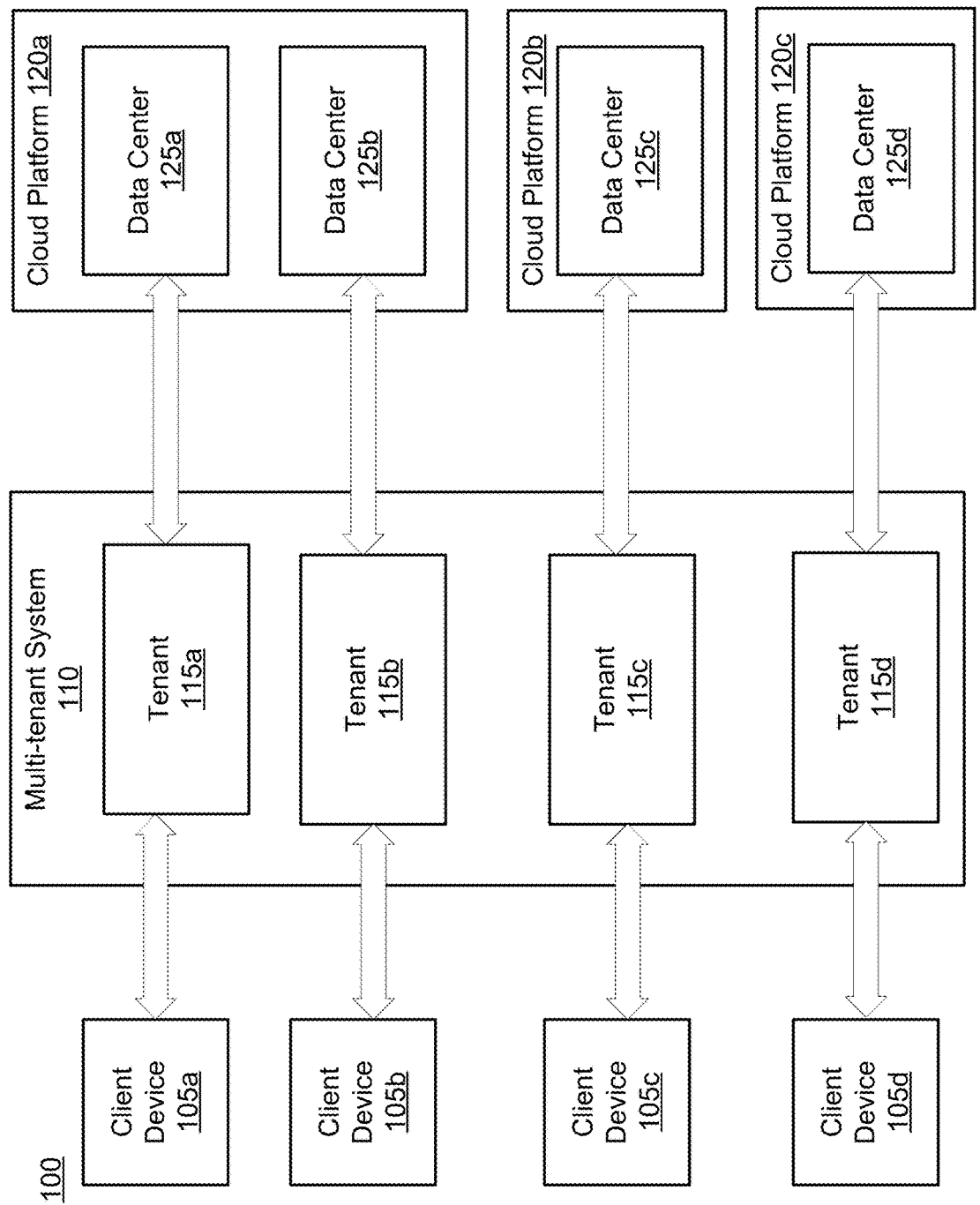
FIG. 1 is a block diagram of a system environment illustrating a multi-tenant system configuring data centers on cloud platforms according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115*a*," indicates that the text refers specifically to the element having that particular reference numeral. A reference numeral in the text without a following letter, such as "115," refers to any or all of the elements in the figures bearing that reference numeral.

DETAILED DESCRIPTION

Cloud platforms provide computing resources, such as storage, computing resources, applications, and so on to computing systems on an on-demand basis via a public network such as internet. Cloud platforms allow enterprises to minimize upfront costs to set up computing infrastructure and also allow enterprises to get applications up and running faster with less maintenance overhead. Cloud platforms also allow enterprises to adjust computing resources to rapidly fluctuating and unpredictable demands. Enterprises can create a data center using a cloud platform for use by users of the enterprise. However, implementing a data center on each cloud platform requires expertise in the technology of the cloud platform.

Embodiments create data centers in a cloud platform using a cloud platform infrastructure language that is cloud platform independent. The system receives a cloud platform independent declarative specification of a data center. The declarative specification describes the structure of the data center and may not provide instructions specifying how to create the data center. The cloud platform independent declarative specification is configured to generate the data center on any of a plurality of cloud platforms and is specified using a cloud platform infrastructure language. The system receives information identifying a target cloud platform for creating the data center and compiles the cloud platform independent declarative specification to generate a cloud platform specific data center representation. The system sends the cloud platform specific data center representation and a set of instructions for execution on the target cloud platform. The target cloud platform executes the instructions to configure the data center using the platform specific data center representation. The system provides users with access to the computing resources of the data center configured by the cloud platform.

In one embodiment, the system performs operations related to software releases on data centers configured on a cloud platform, for example, deploying software releases, provisioning resources, performing rollback of software releases, and so on. The system accesses a data center configured on a target cloud platform. The data center is generated based on a cloud platform independent declarative specification comprising a hierarchy of data center entities. Each data center entity comprises one or more of (1) a service or (2) one or more other data center entities. The system generates a cloud platform independent master pipeline that comprises: (1) a sequence of stages for deployment of a software artifact, for example, a development stage, a test stage, and a production stage, and (2) criteria for promoting the software artifact from one stage to a subsequent stage of the sequence of stages. The system compiles the cloud platform independent master pipeline to generate a cloud platform dependent detailed pipeline for the target cloud platform with instructions for performing operations related to services according to the layout of data center defined by the declarative specification. The system executes the cloud platform dependent detailed pipeline on the target cloud platform, for example, to deploy software releases on data center entities of the data center.

In one embodiment, the system accesses the data center configured on a target cloud platform. The system receives a cloud platform independent artifact version map associating data center entities of the data center with versions of software artifacts targeted for deployment on the data center entities. Each software artifact comprises executable instructions associated with a service configured for execution on one or more cloud platforms.

The system generates a cloud platform specific master pipeline for the target cloud platform based on the cloud platform independent artifact version map. The cloud platform specific master pipeline comprises instructions to perform operations such as build and deploy appropriate versions of deployment artifacts for services on data center entities in accordance with the cloud platform independent version map. The system transmits the cloud platform specific deployment pipeline to the target cloud platform for execution. The artifact version map and the master pipelines can be used to perform various actions related to services including deployment of service, destroying services, provisioning resources for services, destroying resources for services, and so on.

The system allows partial execution of pipelines such that the pipeline can be executed again to complete execution of the remaining stages. The system maintains state of the pipeline execution and checks the state to determine whether a stage should be executed during subsequent executions. The system allows a failed stage to be retried multiple times based on a retry strategy. A retry strategy may depend on the data center entity in a hierarchy of data center entities of a data center. The system receives a pipeline configured to deploy software artifacts on a cloud platform. The pipeline may be generated and comprise a plurality of stages.

The system accesses a state store describing a previous execution of the pipeline. The state store maps a context for a stage to an execution status of the stage. The context represents inputs of the stage and the execution status indicates whether the stage successfully executed in the previous execution of the pipeline. The system executes a subset of the plurality of stages for a subsequent execution of the pipeline by performing the following steps. The system selects a stage. The system determines a context for the stage based on inputs of the stage for the subsequent execution. The system accesses an execution status of the stage from the state store. The system determines based on the execution status of the stage, whether to select the stage as a candidate stage for the subsequent execution of the pipeline or whether to skip the stage during the subsequent execution of the pipeline. If the system determines that the status of the stage for the context indicates a successful execution of the stage, the system skips execution of the stage for the subsequent pipeline execution. If the system determines that the status of the stage for the context fails to indicate a successful execution of the stage, the system marks the stage as a candidate stage for subsequent pipeline execution. The system executes the stage if the stage is selected as a candidate stage for the subsequent execution. Accordingly, stages that successfully executed in a previous run of the pipeline are not executed again when the pipeline is executed subsequently. This ensures idempotency of execution of the pipelines such that repeated execution of a pipeline has the same result as a single execution of the pipeline. Idempotency of the pipeline helps implement retry strategies for pipeline execution.

According to an embodiment, the system implements retry strategies for handling failures while deploying software artifacts on a cloud platform. The system accesses a data center configured on a cloud platform. The datacenter comprises a hierarchy of data center entities. A data center entity comprises one or more of (1) a service or (2) one or more other data center entities below the data center entity in the hierarchy. The data center entity is associated with a retry strategy. The system generates an aggregate pipeline configured to execute on the datacenter entity. The aggregate pipeline comprises a sequence of stages. The system executes the aggregate pipeline by executing the following steps. For each stage of the aggregate pipeline the system executes the stage. The system may encounter a failure during execution of a particular stage of the aggregate pipeline. The failure may be caused by a failure of a stage of a data center entity below the data center entity in the hierarchy. The system repeatedly executes the stage of the aggregate pipeline in accordance with the retry strategy before executing a next stage of the aggregate pipeline. An execution of the stage for the data center entity comprises execution of corresponding pipelines for the other datacenter entities below the data center entity in the hierarchy.

A retry strategy may specify a maximum number of times an execution of the stage is attempted if the stage execution continues to fail. The retry strategy may specify a fixed time delay between successive attempts at execution. The retry strategy may specify an increasing time delay between successive attempts at execution. The retry strategy may specify a size of a time delay for which the stage execution is put on hold responsive to a failure of the stage to allow an issue associated with a failure of the stage to be fixed. The retry strategy may specify a flag indicating that a failure of the stage is ignored, such that the pipeline execution resumes with a following stage.

In an embodiment, different data center entities within the hierarchy may be associated with different retry strategies. For example, a data center entity D1 may be associated with retry strategy S1 and a data center entity D1 below the data center entity D1 may be associated with another retry strategy S2. A pipeline P3 associated with a data center entity D3 that is below D2 in the hierarchy may execute both retry strategies S1 and S2 if a failure of the pipeline P3 continues to occur as the retry strategies are tried.

A cloud platform is also referred to herein as a substrate. The declarative specification of data center is substrate independent or substrate agnostic. If operations related to a data center such as deployment of software releases, provisioning of resources, and so on are performed using conventional techniques, the user has to provide cloud platform specific instructions. Accordingly, the user needs expertise of the cloud platform being used. Furthermore, the instructions are cloud platform specific and are not portable across multiple platforms. For example, the instructions for deploying software on an AWS cloud platform are different from instructions on a GCP cloud platform.

A developer needs to understand the details of how each feature is implemented on that specific cloud platform. The system disclosed provides a cloud platform infrastructure language that allows users to perform operations on data centers using instructions that are cloud platform independent and can be executed on any cloud platform selected from a plurality of cloud platforms. A compiler of the cloud platform infrastructure language generates a cloud platform specific detailed instructions for a target cloud platform.

The cloud platform infrastructure language may be referred to as a domain specific language (DSL). The system may represent a multi-tenant system but is not limited to multi-tenant systems and can be any online system or any computing system with network access to the cloud platform.

System Environment

FIG. 1 is a block diagram of a system environment illustrating a multi-tenant system configuring data centers on cloud platforms according to an embodiment. The system environment 100 comprises a multi-tenant system 110, one or more cloud platforms 120, and one or more client devices 105*a*, 105*b*, 105*c*, 105*d*. In other embodiments, the system environment 100 may include more or fewer components.

The multi-tenant system 110 stores information of one or more tenants 115. Each tenant may be associated with an enterprise that represents a customer of the multi-tenant system 110. Each tenant may have multiple users that interact with the multi-tenant system via client devices 105*a*, 105*b*, 105*c*, 105*d*.

A cloud platform may also be referred to as a cloud computing platform or a public cloud environment. A tenant may use the cloud platform infrastructure language to provide a declarative specification of a data center that is created on a target cloud platform 120*a*, 120*b*, 120*c*, 120*d* and to perform operations using the data center, for example, provision resources, perform software releases and so on. A tenant 115*a*, 115*b*, 115*c*, 115*d* may create one or more data centers on a cloud platform 120*a*, 120*b*, 120*c*, 120*d*. A data center represents a set of computing resources including servers, applications, storage, memory, and so on that can be used by users, for example, users associated with the tenant. Each tenant may offer different functionality to users of the tenant. Accordingly, each tenant may execute different services on the data center configured for the tenant. The multi-tenant system may implement different mechanisms for release and deployment of software for each tenant. A tenant may further obtain or develop versions of software that include instructions for various services executing in a data center. Embodiments allow the tenant to deploy specific versions of software releases for different services running on different computing resources of the data center.

The computing resources of a data center are secure and may not be accessed by users that are not authorized to access them. For example, a data center 125*a* that is created for users of tenant 115*a* may not be accessed by users of tenant 115*b* unless access is explicitly granted. Similarly, data center 125*b* that is created for users of tenant 115*b* may not be accessed by users of tenant 115*a*, unless access is explicitly granted. Furthermore, services provided by a data center may be accessed by computing systems outside the data center, only if access is granted to the computing systems in accordance with the declarative specification of the data center.

With the multi-tenant system 110, data for multiple tenants may be stored in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system 110 may execute an application server that simultaneously processes requests for a number of tenants. However, the multi-tenant system enforces tenant-level data isolation to ensure that jobs of one tenant do not access data of other tenants.

Examples of cloud platforms include AWS (AMAZON web services), GOOGLE cloud platform, or MICROSOFT AZURE. A cloud platform 120 offers computing infrastructure services that may be used on demand by a tenant 115 or by any computing system external to the cloud platform 120. Examples of the computing infrastructure services offered by a cloud platform include servers, storage, databases, networking, security, load balancing, software, analytics, intelligence, and other infrastructure service functionalities. These infrastructure services may be used by a tenant 115 to build, deploy, and manage applications in a scalable and secure manner.

The multi-tenant system 110 may include a tenant data store that stores data for various tenants of the multi-tenant store. The tenant data store may store data for different tenants in separate physical structures, for example, separate database tables or separate databases. Alternatively, the tenant data store may store data of multiple tenants in a shared structure. For example, user accounts for all tenants may share the same database table. However, the multi-tenant system stores additional information to logically separate data of different tenants.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the techniques disclosed herein are described in the context of a multi-tenant system, the techniques can be implemented using other systems that may not be multi-tenant systems. For example, an online system used by a single organization or enterprise may use the techniques disclosed herein to create one or more data centers on one or more cloud platforms 120.

System Architecture

Figure 2A:
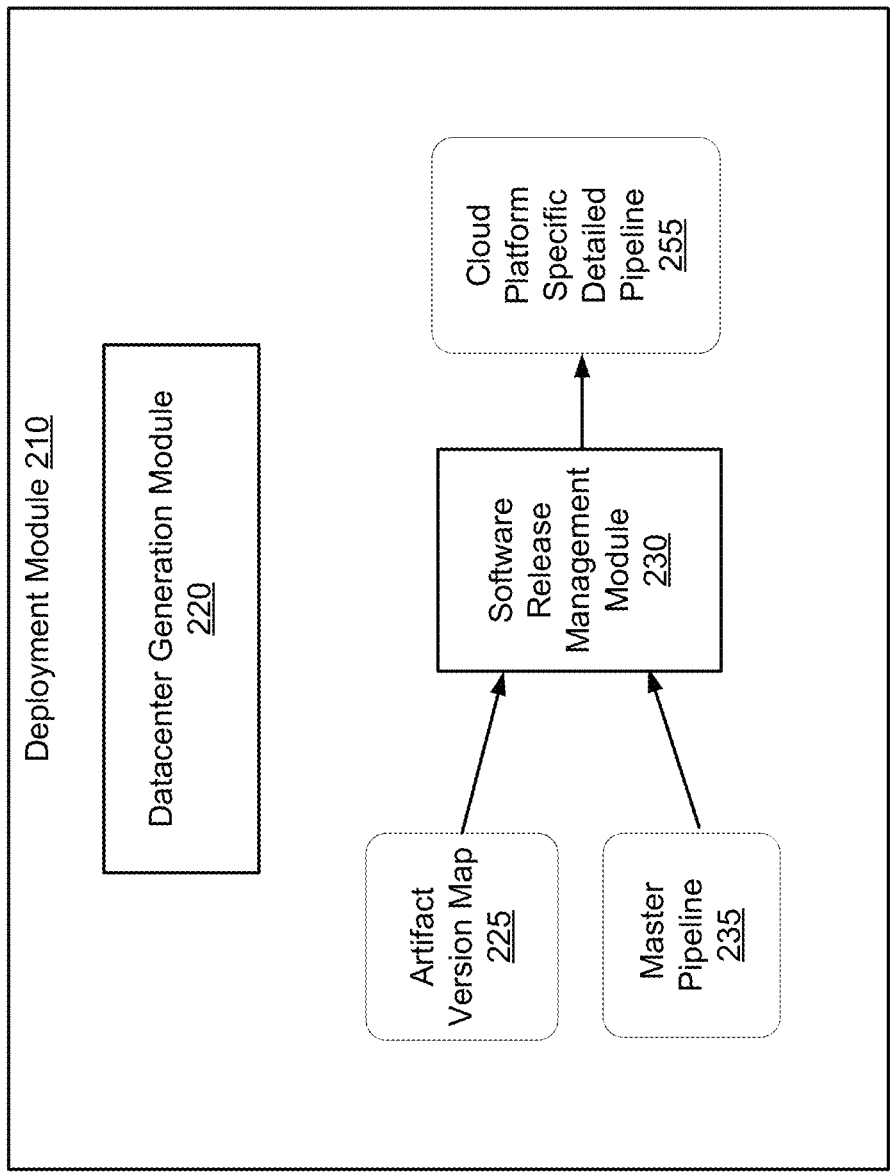
FIG. 2A is a block diagram illustrating the system architecture of a deployment module 210 according to an embodiment.

The multi-tenant system 110 includes a deployment module for deploying software artifacts on the cloud platforms. The deployment module can perform various operations associated with software releases, for example, provisioning resources on a cloud platform, deploying software releases, performing rollbacks of software artifacts installed on data center entities, and so on. FIG. 2 is a block diagram illustrating the system architecture of a deployment module 210 according to an embodiment. The deployment module 210 includes a data center generation module 220 and a software release management module 230. Other embodiments can have different and/or other components than the ones described here, and that the functionalities can be distributed among the components in a different manner.

The data center generation module 220 includes instructions for creating data centers on the cloud platform. The software release management module 230 includes instructions for deploying software releases for various services or applications running on the data centers created by the data center generation module 220.

Figure 4:
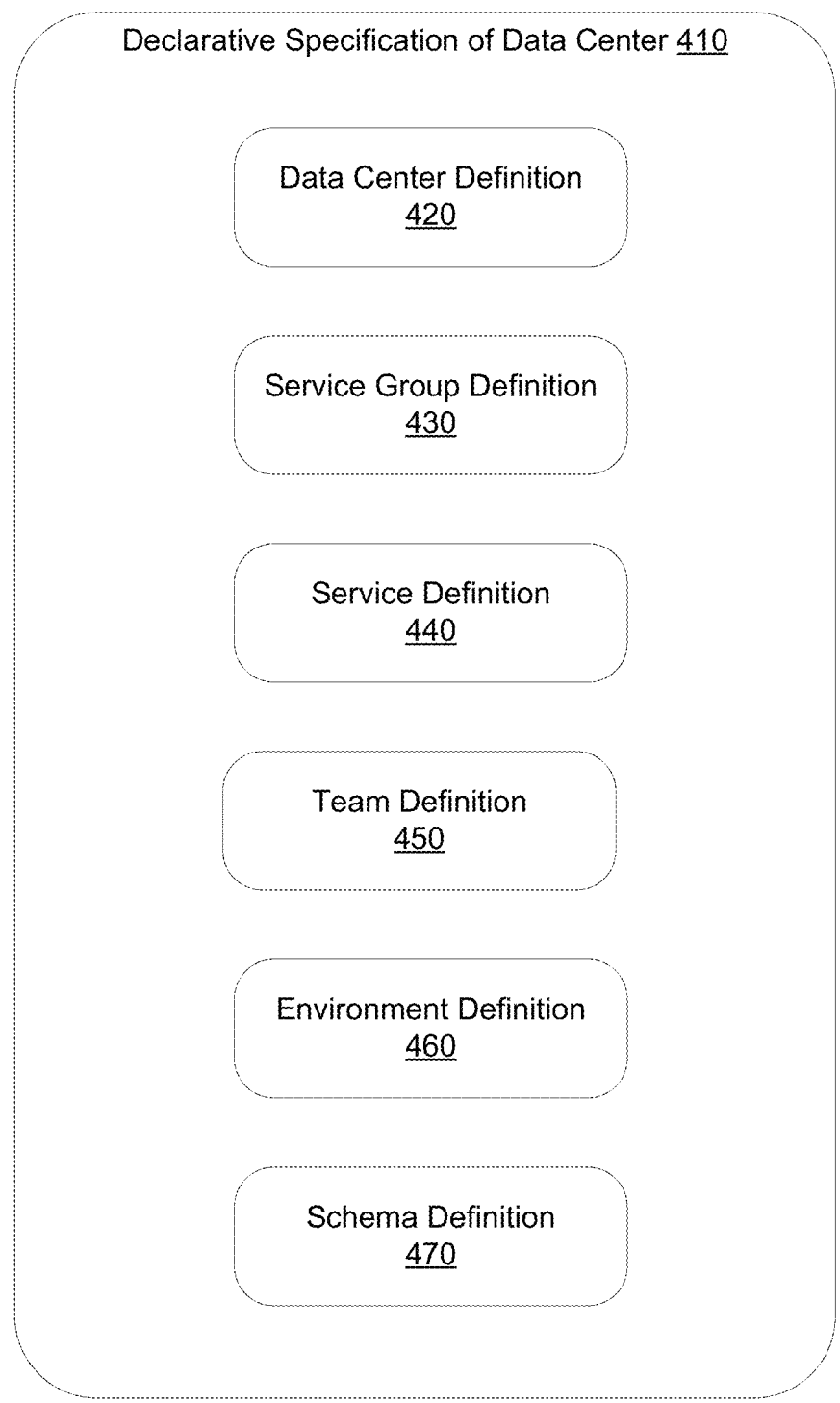
FIG. 4 illustrates an example of a data center declarative specification according to one embodiment.

The data center generation module 220 receives from users, for example, users of a tenant, a cloud platform independent declarative specification of a data center. The cloud platform independent declarative specification of a data center specifies various entities of the data center. In an embodiment, the cloud platform independent declarative specification of a data center comprises a hierarchical organization of data center entities, where each data center entity may comprise one or more services, one or more other data center entities or a combination of both. FIG. 4 describes various types of data center entities in further detail. The data center generation module 220 receives the platform independent declarative specification and a target cloud platform as input and generates a cloud platform specific metadata representation for the target cloud platform. The data center generation module 220 deploys the generated cloud platform specific metadata representation on the target cloud platform to create a data center on the target cloud platform according to the declarative specification.

The software release management module 230 receives as inputs (1) an artifact version map 225 and (2) a master pipeline 235. The artifact version map 225 identifies specific versions of software releases or deployment artifacts that are targeted for deployment on specific data center entities. The artifact version map 225 maps data center entities to software release versions that are targeted to be deployed on the data center entities. The master pipeline 235 includes instructions for operations related to software releases on the data center, for example, deployment of services, destroying services, provisioning resources for services, destroying resources for services, and so on.

The master pipeline 235 may include instructions for performing operations related to software releases for different environments such as development environment, test environment, canary environment, and production environment, and instructions for determining when a software release is promoted from one environment to another environment. For example, if the deployments of a software release in a development environment execute more than a threshold number of test cases, the software release is promoted for test environment for further testing, for example, system level and integration testing. If the software release in a test environment passes a threshold of test coverage, the software release is promoted to canary environment where the software release is provided to a small subset of users on a trial basis. If the software release in a canary environment executes without errors for a threshold time, the software release is promoted to production environment where the software release is provided to all users.

The software release management module 230 compiles the input artifact version map 225 and the master pipeline 235 to generate a cloud platform specific detailed pipeline 255 that is transmitted to the target cloud platform. The cloud platform specific detailed pipeline 255 includes instructions for deploying the appropriate version of a software release or deployment artifact on the data center entities as specified in the artifact version map 225. The software release management module 230 may receive modifications to one of the inputs. For example, a user may modify the input artifact version map 225 and provide the same master pipeline 235. Accordingly, the same master pipeline is being used but different software releases are being deployed on data center entities. The software release management module 230 recompiles the inputs to generate a new cloud platform specific detailed pipeline 255 that deploys the versions of software releases according to the new artifact version map 225.

The artifact version map may also be referred to as a deployment manifest, a version manifest, a software release map, or a software artifact version map. The master pipeline may also be referred to as a master deployment pipeline or a master orchestration pipeline.

Figure 2B:
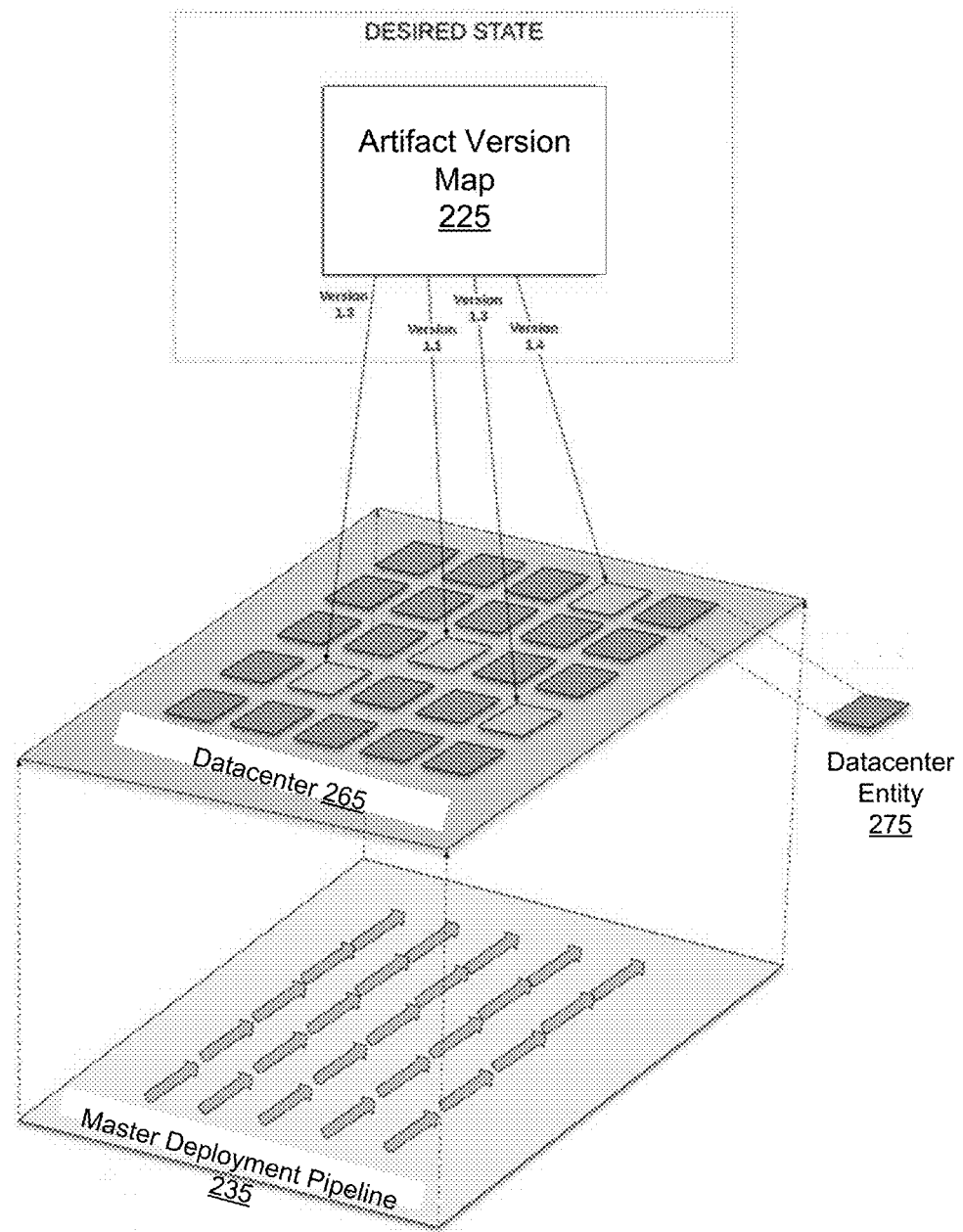
FIG. 2B illustrates the overall process for deploying software artifacts in a data center according to an embodiment.

FIG. 2B illustrates the overall process for deploying software artifacts in a data center according to an embodiment. FIG. 2B shows a layout of a data center 265 including various data center entities. As shown in FIG. 2B, the artifact version map 225 identifies the different versions of software that are targeted for release on different data center entities 275 of the data center 265. The master pipeline represents the flow of deployment artifacts through the various environments of the data center. The software release management module 230 combines the information in the master pipeline 235 with the artifact version map 225 to determine cloud platform specific detailed pipeline 255 that maps the appropriate version of software artifacts on the data center entities according to the artifact version map 225.

Figure 3:
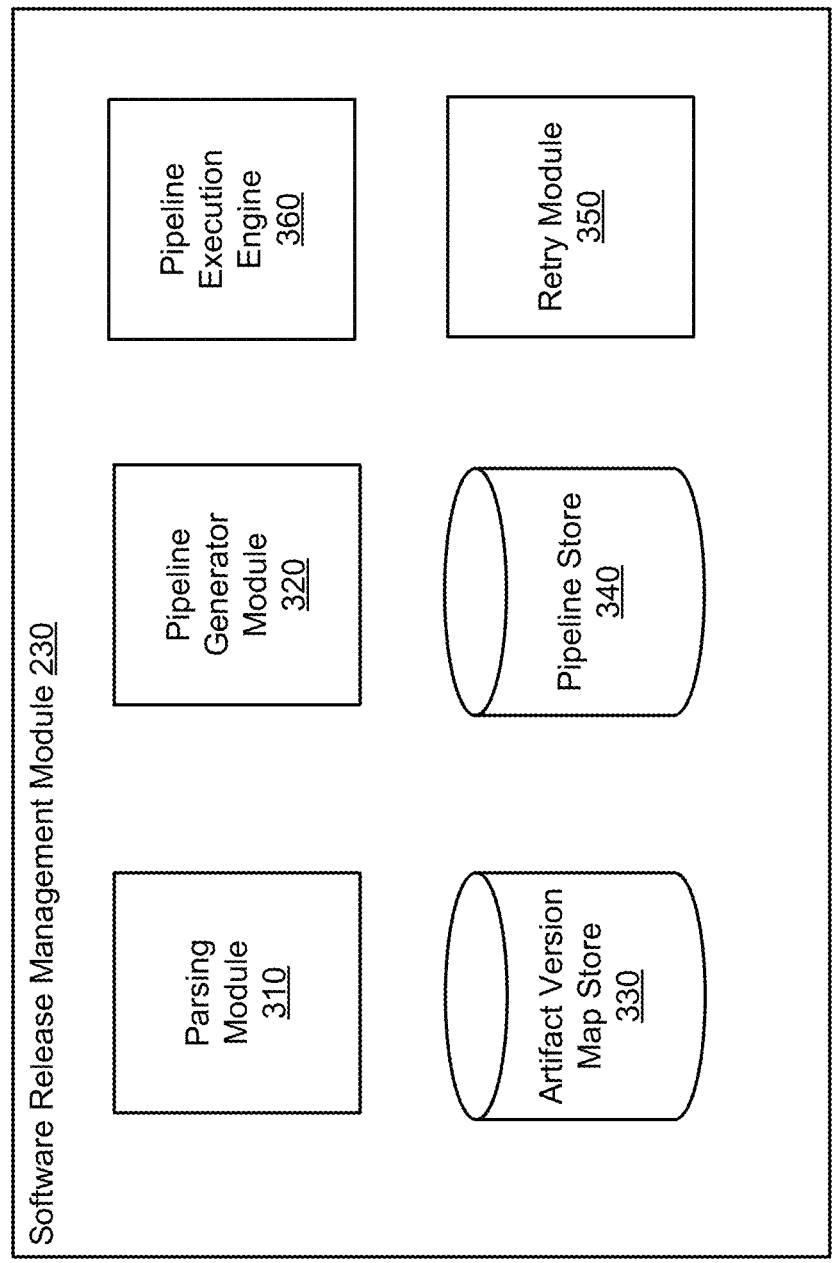
FIG. 3 is a block diagram illustrating the architecture of a software release management module according to one embodiment.

FIG. 3 is a block diagram illustrating the architecture of a software release management module 230 according to one embodiment. The software release management module 230 includes a parsing module 310, a pipeline generator module 320, an artifact version map store 330, a pipeline store 340, a retry module 350, and a pipeline execution engine 360. Other embodiments may include more, fewer, or different modules than those indicated herein in FIG. 3.

The parsing module 310 parses various types of user input including declarative specification of a data center, artifact version map 225, and master pipelines 235. The parsing module 310 generates data structures and metadata representations of the input processed and provides the generated data structures and metadata representations to other modules of the software release management module 230 for further processing.

The metadata store 340 stores various transformed metadata representations of data centers that are generated by the software release management module 230. The transformed metadata representations may be used for performing rollback to a previous version if an issue is encountered in a current version of the data center. The transformed metadata representations may be used for validation, auditing, governance, and so on at various stages of the transformation process.

The pipeline generator module 320 processes the master pipelines in conjunction with the artifact version map received as input to generate a detailed pipeline for a target cloud platform. The pipelines comprise stages that include instructions for provisioning services or deploying applications for deploying versions of software releases for various services on the cloud platform according to the artifact version map. The artifact version map store 330 stores artifact version maps received from users and the pipeline store 340 stores master pipelines as well as pipelines generated by the pipeline generator module 320.

Figure 14:
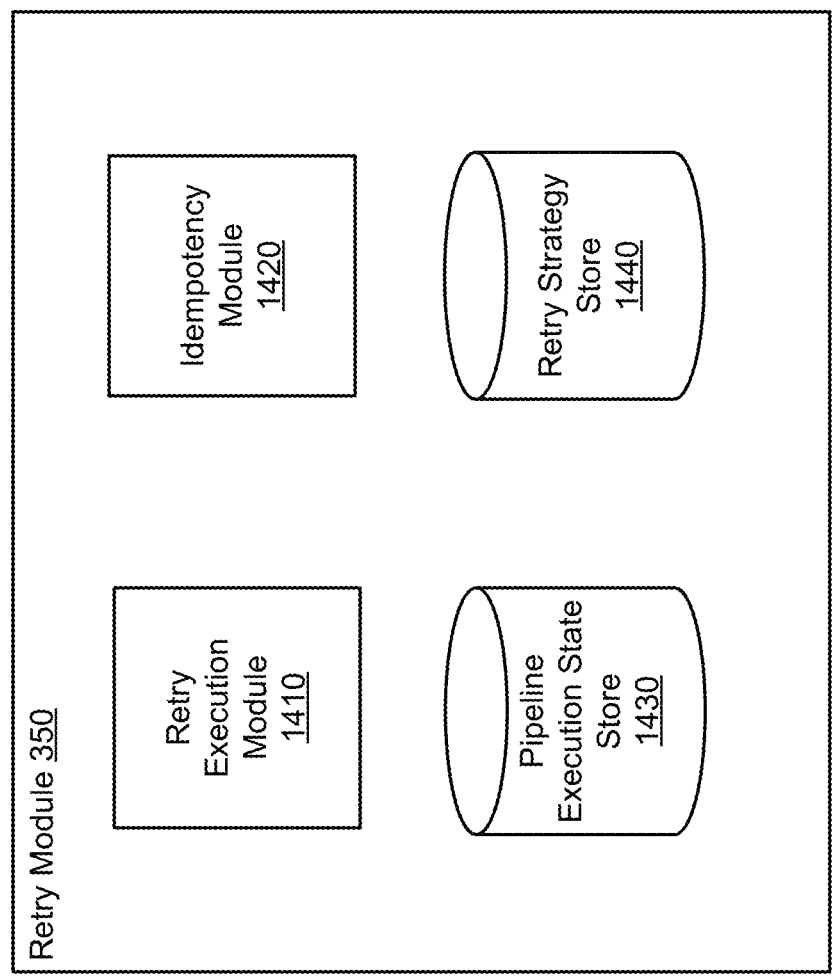
FIG. 14 shows a system architecture of a retry module according to an embodiment.

The retry module 350 implements pipelines that are configured to allow retry of stages during execution. For example, a stage may be configured to allow retry according to a retry strategy. During execution of the pipeline, if the stage fails, the stage execution is retried according to the retry strategy. Since a pipeline may be an aggregate pipeline, each stage can itself be a pipeline, which in turn includes stages that are further pipelines and so on. A stage may fail due to failure of any stage of a nested pipeline within the stage. The retry module 350 also implements idempotency in execution of the pipeline such that if a pipeline is executed a subsequent time after a previous failure, the stages that previously executed successfully are skipped and only the stages that did not complete execution successfully in the previous runs are executed in a subsequent run. Details of the retry module are illustrated in FIG. 14 and described in connection with FIG. 14.

The pipeline execution engine 360 executes the detailed pipelines generated by the pipeline generator module 320. In an embodiment, the pipeline execution engine 360 is a system such as SPINNAKER that executes pipelines for releasing/deploying software. The pipeline execution engine 360 parses the pipelines and executes each stage of the pipeline on a target cloud computing platform.

Cloud Platform-Based Data Center Generation

FIG. 4 illustrates an example of a declarative specification of a data center according to one embodiment. The declarative specification 410 includes multiple data center entities. A data center entity is an instance of a data center entity type and there can be multiple instances of each data center entity type. Examples of data center entities include data centers, service groups, services, teams, environments, and schemas.

The declarative specification 410 includes definitions of various types of data center entities including service group, service, team, environment, and schema. The declarative specification includes one or more instances of data centers. Following is a description of various types of data center entities and their examples. The examples are illustrative and show some of the attributes of the data center entities. Other embodiments may include different attributes and an attribute with the same functionality may be given a different name than that indicated herein. In an embodiment, the declarative specification is specified using hierarchical objects, for example, JSON (Javascript object notation) that conform to a predefined schema.

A service group 520 represents a set of capabilities and features and services offered by one or more computing systems that can be built and delivered independently, in accordance with one embodiment. A service group may be also referred to as a logical service group, a functional unit, or a bounded context. A service group 520 may also be viewed a set of services of a set of cohesive technical use-case functionalities offered by one or more computing systems. A service group 520 enforces security boundaries. A service group 520 defines a scope for modifications. Thus, any modifications to an entity, such as a capability, feature, or service offered by one or more computing systems within a service group 520 may propagate as needed or suitable to entities within the service group, but does not propagate to an entity residing outside the bounded definition of the service group 520. A data center may include multiple service groups 520. A service group definition specifies attributes including a name, description, an identifier, schema version, and a set of service instances. An example of a service group is a blockchain service group that includes a set of services used to providing blockchain functionality. Similarly, a security service group provides security features. A user interface service group provides functionality of specific user interface features. A shared document service group provides functionality of sharing documents across users. Similarly, there can be several other service groups.

Service groups support reusability of specification so that tenants or users interested in developing a data center have a library of service groups that they can readily use. The boundaries around services of a service groups are based on security concerns and network concerns among others. A service group is associated with protocols for performing interactions with the service group. In an embodiment, a service group provides a collection of APIs (application programming interfaces) and services that implement those APIs. Furthermore, service groups are substrate independent. A service group provides a blast radius scope for the services within the service group so that any failure of a service within the service group has impact limited to services within the service group and has minimal impact outside the service group.

Following is an example of a specification of a service group. The service group specifies various attributes representing metadata of the service group and includes a set of services within the service group. There may be other types of metadata specified for a service group, not indicated herein.

```
{
   "service_group": [
      {
         "cells": [ ],
         "description": "Service group Service Instance Definitions",
         "service_group_id": "id1",
         "name": "name1",
         "schema_version": "1.0",
         "cluster_instances": [
            {
               "cluster_instance_name": "cluster1",
               "cluster_type": "cluster_type1"
            },
            {
               "cluster_instance_name": " cluster2",
               "cluster_type": " cluster_type1"
            },
            {
               "cluster_instance_name": " cluster3",
               "cluster_type": " cluster_type2"
            }
         ],
         "service_instances": [
            {
               "service_instance_name": "serviceinstance0001",
               "service_type": "servicetype1"
            },
            {
               "service_instance_name": "serviceinstance0002",
               "service_type": " servicetype1"
               "cluster_instance": "cluster1"
            },
            {
               "service_instance_name": "serviceinstance0003",
               "service_type": " servicetype2"
            },
            ...
         ],
         "service_teams": ["team1"],
         "type": "servicetype"
         "security_groups":[
            {
               "name":"group1",
               "policies":[
                  {
                     "description":"Allow access from site S1",
                     "destination":{ "groups":[ "group2" ] },
                     "environments":[ "dev", "test", "staging" ],
                     "source":{
                        "iplist":"URL1",
                        "filters":[ filter-expression ]
                     }
                  }
               ]
            }
         ]
      }
   ]
}
```

As shown in the example above, a service group may specify a set of clusters. A cluster represents a set of computing nodes, for example, a set of servers, a set of virtual machines, or a set of containers (such as KUBERNETES containers). A physical server may run multiple containers, where each container has its own share of filesystem, CPU, memory, process space, and so on.

The service group specifies a set of services. A service group may specify a cluster for a service so that the data center deployed on a cloud platform runs clusters of computing nodes and maps the services to clusters based on the specified mapping if included in the declarative specification. For example, in the service group example shown above, the service instance serviceinstance0002 is specified to run on cluster instance cluster1.

The service group may specify security groups, each security group specifying a set of services that are allowed to interact with each other. Services outside the security group are required to pass additional authentication to communicate with services within the security group. Alternatively, the services within a security group use one protocol to interact with each other and services outside the security group use a different protocol that requires enhances authentication to interact with services within the security group. Accordingly, a security group specifies policies that determine how services can interact with each other. A security policy may specify one or more environments for which the security policy is applicable. For example, a security policy policy1 may apply to a particular environment env1 (e.g., production environment) and another security policy policy2 may apply to another environment env2 (e.g., development environment). A security policy may be specified for a service group type or for a specific service type.

In an embodiment, the security policy specifies expressions for filtering the service groups based on various attributes so that the security policy is applicable to the filtered set of service groups. For example, the security policy may specify a list of IP (internet protocol) addresses that are white listed for a set of service groups identified by the filtered set and accordingly these computing systems are allowed access to the service group or to specific set of services within the service group.

In an embodiment, a security policy may specify for a service group, a set of source services and a set of destination services. The source services for a particular service specify the services outside the security group that are allowed to connect with this particular service. The destination services for a particular service specify the services outside the security group that this particular service needs to connect to. During provisioning and deployment, the data center generation module generates instructions for the cloud platform that implement specific network policies using cloud platform specific features and network functionality such that the network policies implement the security policies specified in the declarative specification.

A data center entity called a cell represents a set of services that interact with each other in a vertical fashion and can be scaled by additional instances or copies of the cell, i.e., copies of the set of services. Creating multiple instances of a cell allows a system to scale a set of services that interact with each other. A data center instance may include one or more cells. Each cell may include one or more services. A data center may include instances of service groups or cells.

A service definition specifies metadata for a type of service, for example, database service, load balancer service, and so on. The metadata be describe various attributes of a service including a name of the service, description of the service, location of documentation for the service, any sub-services associated with the service, an owner for the service, a team associated with the service, build dependencies for the service specifying other services on which this service depends at build time, start dependencies of the service specifying the other services that should be running when this particular service is started, authorized clients, DNS (domain name server) name associated with the service, a service status, a support level for the service, and so on. The service definition specifies a listening ports attribute specifying the ports that the service can listen on for different communication protocols, for example, the service may listen on a port p1 for UDP protocol and a port p2 for TCP protocol. Other services within the data center can interact with a service via the ports specified by the service.

The service definition specifies an attribute outbound access that specifies destination endpoints, for example, external URLs (uniform resource locators) specifying that the service needs access to the specified external URLs. During deployment, the data center generation module ensures that the cloud platform implements access policies such that instances of this service type are provided with the requested access to the external URLs.

The outbound access specification may identify one or more environment types for the service for which the outbound access is applicable. For example, an outbound access for a set of endpoints S1 may apply to a particular environment env1 (e.g., production environment) and outbound access for a set of endpoints S2 may apply to another environment env2 (e.g., development environment).

Following is an example of a service definition.

```
{
    "service_definition": [
        {
            "authorized_clients": [ ],
            "build_dependencies": [ ],
            "description": "description of service",
            "dns_name": "dns1",
            "documentation": "URL",
            "name": "name1",
            "namespace": "space1",
            "service_owner": "user1",
            "service_status": "GA",
            "service_team": "team1",
            "support_level": "STANDARD",
            "start_dependencies": ["svc5", "svc7", ...],
            "sub_services": [ "service1", " service2", " service3", ... ],
            "listening_ports":[
                { "protocol":"tcp", "ports":[ "53" ] },
                { "protocol":"udp","ports":[ "53" ] }
            ]
            "outbound_access": [
                {
                    "destination":[
                        {
                            "endpoints":[ ".xyz.com:443",
                            ".pqr.com:443" ]
                        }
                    ]
                }
            ],
        }
    ]
}
```

A team definition 450 includes team member names and other attributes of a team for example, name, email, communication channel and so on. Following is an example of a team definition. A service may be associated with one or more teams that are responsible to modifications made to that service. Accordingly, any modification made to that service is approved by the team. A service may be associated with a team responsible for maintenance of the service after it is deployed in a cloud platform. A team may be associated with a service group and is correspondingly associated with all services of that service group. For example, the team approves any changes to the service group, for example, services that are part of the service group. A team may be associated with a data center and is accordingly associated with all service groups within the data center. A team association specified at a data center level provides a default team for all the service groups within the data center and further provides a default team for all services within the service groups.

According to an embodiment, a team association specified at the functional level overrides the team association provided at the data center level. Similarly, a team association specified at the service level overrides the default that may have been provided by a team association specified at the service group level or a data center level. A team can decide how certain action is taken for the data center entity associated with the team. The team associations also determine the number of accounts on the cloud platform that are created for generating the final metadata representation of the data center for a cloud platform by the compiler and for provisioning and deploying the data center on a cloud platform. The data center generation module 210 creates one or more user accounts in the cloud platform and provides access to the team members to the user accounts. Accordingly, the team members are allowed to perform specific actions associated with the data center entity associated with the team, for example, making or approving structural changes to the data center entity or maintenance of the data center entity when it is deployed including debugging and testing issues that may be identified for the data center entity.

Conventional techniques associate the same team with the data center through out the design process thereby resulting in the organizational structure having an impact on the design of the data center or service group. Embodiments decouple the team definition from the constructions that define the data center entity, thereby reducing the impact of the teams on the design and architecture of the data center entity.

```
{
    "team_definition": [
        {
            "name": "team1",
            "description": "description of team",
            "admins": [
                "user1",
                "user2",
                "user3",
                "user4",
                ...
            ],
            "team_id": "id1",
            "owner": "owner_id",
            "email": "team1@xyz.com",
        }
    ],
    "communication_channel": "channel1"
    "schema_version": "1.0"
}
```

An environment definition 460 specifies a type of system environment represented by the data center, for example, development environment, staging environment, test environment, or production environment. A schema definition 470 specifies schema that specifies syntax of specific data center entity definitions. The schema definition 470 is used for validating various data center entity definitions. The data center generation module determines security policies for the data center in the cloud platform specific metadata representation based on the environment. For example, a particular set of security policies may be applicable for an environment env1 and a different set of security policies may be applicable for environment env2. For example, the security policies provide much more restricted access in production environment as compared to development environment. The security policy may specify the length of time that a security token is allowed to exist for specific purposes. For example, long access tokens (e.g., week long access tokens)

may be allowed in development environment but access tokens with much smaller life time (e.g., few hours) used in production environment. Access tokens may allow users or services with access to specific cloud platform resources.

A data center definition 420 specifies the attributes and components of a data center instance. A declarative specification may specify multiple data center instances. The data center definition 420 specifies attributes including a name, description, a type of environment, a set of service groups, teams, domain name servers for the data center, and so on. A data center definition may specify a schema definition and any metadata representation generated from the data center definition is validated against the specified schema definition. A data center includes a set of core services and capabilities that enable other services to function within the data center. An instance of a data center is deployed in a particular cloud platform and may be associated with a particular environment type, for example, development, testing, staging, production, and so on.

Following is a definition of a data center instance. The data center instance definition includes a list of service groups included in the data center instance and other attributes including an environment of the data center, a data center identifier, a name, a region representing a geographical region, one or more teams associated with the data center, and a schema version.

```
{
    "data center_instance": {
        "environment": "env1",
            "data center_instance_identifier": "id1",
            "name": "data_center1",
            "region": "region1",
            "service_groups": [
                "service_group1",
                " service_group2",
                " service_group3",
                "service_group4",
                ...
            ],
            "schema_version": "1.0",
            "admin_team":"admins",
            ...
        }
    }
}
```

Figure 5:
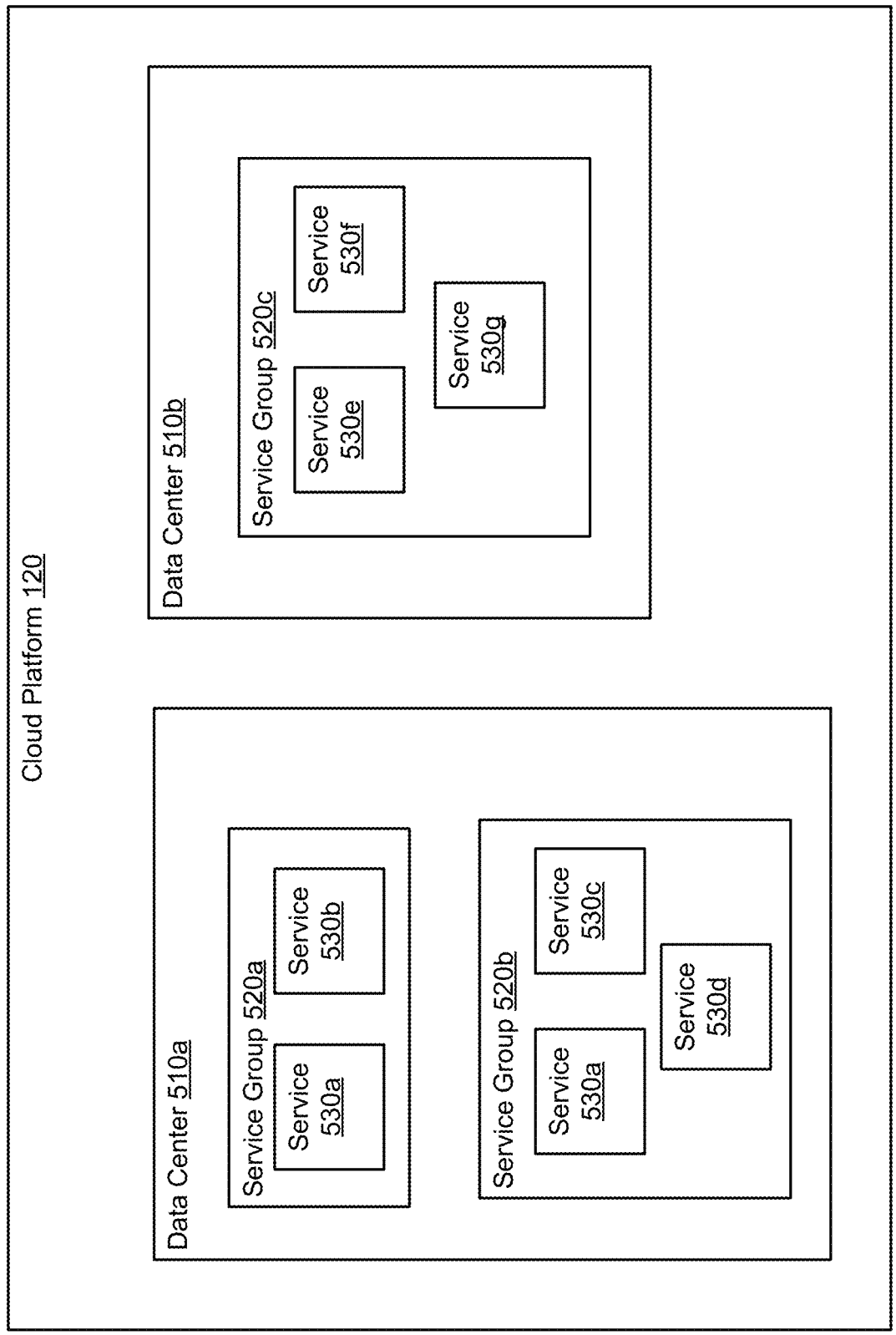
FIG. 5 illustrates example data centers created on a cloud platform based on a declarative specification according to one embodiment.

FIG. 5 illustrates some example data centers created on a cloud platform based on a declarative specification according to one embodiment. The data centers 510 may be created based on a declarative specification processed by the data center generation module 210. As shown in FIG. 5, multiple data centers may be configured within a cloud platform 120. Each data center 510 may correspond to a tenant 115 of a multi-tenant system 110. A tenant 115 may create one or more data centers 510. Alternatively, a data center 510 may be created by any computing system. Each data center includes one or more service groups. For example, data center 510a includes service groups 520a and 520b and data center 510b includes service group 520c. A data center may include multiple instances of a particular type of service group. Each service group includes a set of services. For example, service group 520a includes services 530a and 530b, service group 520b includes services 530a, 530b, and 530c, and service group 520c includes services 530e, 530f, and 530g. A service group may include multiple instances of services of the same service type.

The data center generation module 220 creates data centers on cloud platforms based on a declarative specification using the following steps. The data center generation module 210 receives a cloud platform independent declarative specification of a data center. The cloud platform independent declarative specification may be for a tenant of the multi-tenant system or for any other computing system, for example, an online system. The cloud platform independent declarative specification is specified using the cloud platform infrastructure language. The cloud platform independent declarative specification of the data center is configured to generate the data center on any of a plurality of cloud platforms.

The data center generation module 210 receives information identifying a target cloud platform for creating the data center based on the cloud platform independent declarative specification. The target cloud platform could be any of a plurality of cloud platforms, for example, AWS, AZURE, GCP, and so on. The data center generation module 210 further receives information to connect with the target cloud platform, for example, credentials for creating a connection with the target cloud platform. A cloud platform may also be referred to as a cloud computing platform.

The data center generation module 210 compiles the cloud platform independent declarative specification to generate a cloud platform specific data center representation for creating the data center on the target cloud computing platform. For example, the cloud platform specific data center representation may refer to user accounts, network addresses, and so on that are specific to the target cloud computing platform.

The data center generation module 210 sends the platform specific data center representation along with instructions for deploying the data center on the target cloud computing platform. The target cloud computing platform executes the instructions to configure the computing resources of the target cloud computing platform to generate the data center according to the platform specific data center representation. The data center generation module 210 provides users with access to the computing resources of the data center configured by the cloud computing platform. For example, if the data center was created for a tenant of the multi-tenant system, users associated with the tenant are provided with access to the data center.

Figure 6:
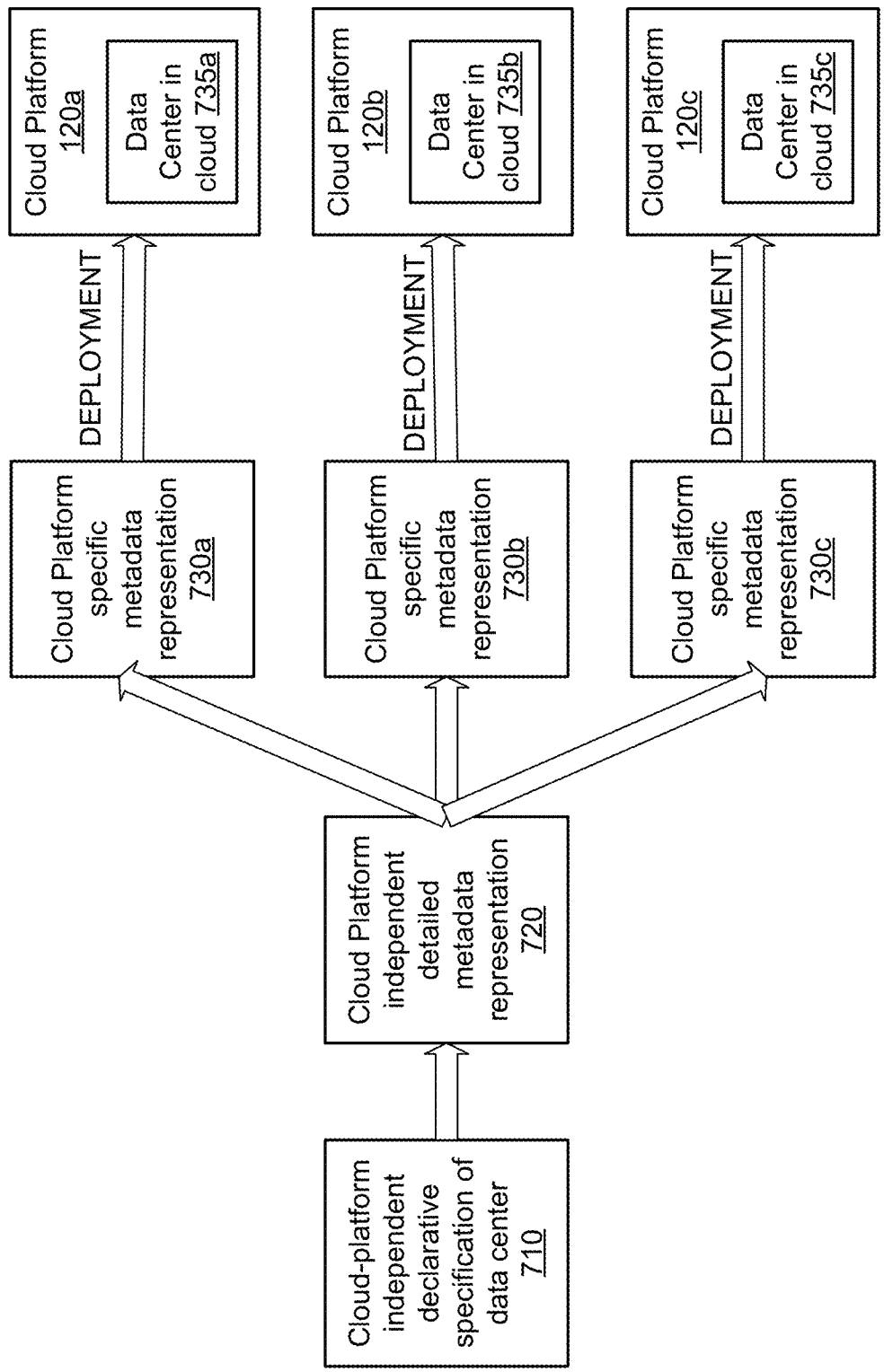
FIG. 6 is a block diagram illustrating generation of data centers on cloud platforms based on a declarative specification, according to one embodiment.

FIG. 6 is a block diagram illustrating generation of data centers on cloud platforms based on a declarative specification, according to one embodiment. The data center generation module 210 receives as input a cloud-platform independent declarative specification 610. The cloud-platform independent declarative specification 610 may be a version of the declarative specification that is being incrementally modified by users. The data center generation module 210 processes a particular version of the cloud-platform independent declarative specification 610. Since cloud-platform independent declarative specification 610 is not specified for any specific target cloud platform, the data center generation module 210 can configure a data center on any target cloud platform based on the cloud-platform independent declarative specification 610.

The data center generation module 210 processes the cloud-platform independent declarative specification 610 to generate a cloud-platform independent detailed metadata representation 620 for the data center. The cloud-platform independent detailed metadata representation 620 defines details of each instance of data center entity specified in the cloud-platform independent declarative specification 610.

The data center generation module 210 creates unique identifiers for data center entity instances, for example, service instances.

In an embodiment, the cloud-platform independent detailed metadata representation 620 includes an array of instances of data center entity types, for example, an array of service group instances of a particular service group type. Each service group instance includes an array of service instances. A service instance may further include the details of a team of users that are allowed to perform certain actions associated with the service instance. The details of the team are used during provisioning and deployment by the data center generation module 210, for example, for creating a user account for the service instance and allowing members of the team to access the user account.

The cloud-platform independent detailed metadata representation 620 includes attributes of each instance of data center entity. Accordingly, the description of each instance of data center entity is expanded to include all details. As a result, the cloud-platform independent detailed metadata representation 620 of a data center may be significantly larger than the cloud-platform independent declarative specification 610. For example, the cloud-platform independent declarative specification 610 may be few thousand lines of specification, whereas the cloud-platform independent detailed data center representation 620 may be millions of lines of generated code. As a result, the data center generation module 210 keeps the cloud-platform independent detailed metadata representation 620 as immutable, i.e., once the representation is finalized, no modifications are performed to the representation. For example, if any updates, deletes, or additions of data center entities need to be performed, they are performed on the cloud platform independent declarative specification 610.

The data center generation module 210 receives a target cloud platform on which the data center is expected to be provisioned and deployed and generates a cloud platform specific detailed metadata representation 630 of the data center. For example, the data center generation module 210 interacts with the target cloud platform to generate certain entities (or resources), for example, user accounts, virtual private clouds (VPCs), and networking resources such as subnets on the VPCs, various connections between entities in the cloud platform, and so on. The data center generation module 210 receives resource identifiers of resources that are created in the target cloud platform, for example, user account names, VPC IDs, and so on, and incorporates these in the cloud-platform independent detailed metadata representation 620 to obtain the cloud platform specific metadata representation 630 of the data center. In an embodiment, the data center generation module 210 creates one unique user account on the cloud platform for each team for a given combination of a service group and a service. The user account is used by the team for performing interactions with that particular service for that service group, for example, for debugging, for receiving alerts, and so on.

The target cloud platform may perform several steps to process the cloud-platform specific detailed metadata representation 630. For example, the cloud platform independent declarative specification may specify permitted interactions between services. These permitted interactions are specified in the cloud-platform specific detailed metadata representation 630 and implemented as network policies of the cloud platform. The cloud platform may further create security groups to implement network strategies to implement the data center according to the declarative specification.

The cloud platform independent declarative specification specifies dependencies between services, for example, start dependencies for each service listing all services that should be running when a particular service is started. The data center generation module 220 generates the cloud platform specific detailed metadata representation of the data center that includes information describing these dependencies such that the instructions for deploying the service ensure that the cloud platform starts the services in an order specified by the dependencies such that for each service, the services required to be started before the service are running when the service is started. Accordingly, the dependencies between services represent a dependency graph and the cloud platform starts running the services in an order determined based on the dependency graph such that if service A depends on service B, the service B is started before service A is started.

The data center generation module 220 creates trust relationships between user accounts that allow services to access other services via secure communication channels. These trust relationships are generated using substrate specific instructions generated based on the declarative specification, for example, based on outbound access attributes specified for services. The data center generation module 220 sends instructions to the cloud platform to create network policies based on cloud platform specific mechanisms that control the interactions and access across service groups and services, for example, as specified by the constructs of the declarative specification such as outbound access, security groups, security policies and so on.

The data center generation module 210 deploys the cloud platform specific metadata representation 630 on the specific target cloud platform for which the representation was generated. The data center generation module 210 may perform various validations using the generated metadata representations, including policy validations, format validations, and so on.

The cloud platform independent declarative specification 610 may be referred to as a declared data center representation, cloud-platform independent detailed metadata representation 620 referred to as a derived metadata representation of the data center, and cloud platform specific metadata representation 630 referred to as a hydrated metadata representation of the data center.

Overall Process for Deployment of Software Artifacts on a Data Center

FIG. 7 shows the overall process for generating pipelines for deployment of software artifacts on data centers configured on a cloud platform according to an embodiment. The data center generation module generates 710 one or more data centers on a target cloud platform. Each data center is generated from a cloud platform independent declarative specification and has a hierarchy of data center entities.

The software release management module 230 generates 720 a cloud platform independent master pipeline. In an embodiment, the cloud platform independent master pipeline includes stages corresponding to environments of the data centers, for example, development environment, test environment, canary environment, and production environment. The master pipeline composes a sequence of progressive and/or conditional deployment across various environments such as development environment, test environment, staging environment, or production environment. The master pipeline may be triggered by delivery of the image for a software artifact and includes stages or instructions to deploy the build in environments of type development. The software artifact that is built is conditionally promoted to one or more test environments, followed by one or more canary environments before eventually getting deployed to production environments. The master pipeline may be customized by users, for example, service owners to represent a specific orchestration across environments. The master pipeline may be customized to capture specific promotion criteria for moving from one stage to next. For example, different tenants of the multi-tenant system may customize the master pipeline in a different manner. In an embodiment, the master pipeline by default uses the latest version of software for a software artifact for a service and builds and deploys the version across various environments. The user can use the artifact version map to ensure that a specific version of a software artifact is deployed on specific data center entities.

In an embodiment, each service deployed in the data center has a cloud platform independent master pipeline generated from the data center entities as defined by the declarative specification of the data center, for example, master pipeline for data center instances, master pipeline for service groups, master pipeline for cells, master pipeline for services, and so on. The master pipelines may be triggered on delivery of images of software artifacts. The master pipelines may implement a service owner-controlled continuous deployment. The master pipelines may implement data center instance owner-owned or release owner-owned on-demand deployment.

Certain portions of the master pipeline may be customized by the users, for example, by tenants of a multi-tenant system that are deploying services on a data center. For example, the promotion decision pipeline may be customized by a tenant to determine which test cases are executed and what threshold is The software release management module 230 receives 730 customizations to logic for promoting a software artifact from one stage to another stage of the cloud platform independent master pipeline.

The software release management module 230 compiles 740 the cloud platform independent master pipeline to generate a cloud platform specific detailed deployment pipeline that is specific to the hierarchy of data center entities of each data center as specified by the cloud platform independent declarative specification for the data center.

The software release management module 230 further receives 750 code for releasing one or more features of services deployed on the data center. The software release management module 230 executes 760 the cloud platform specific detailed deployment pipeline to deploy software artifacts based on the received code.

Figure 8:
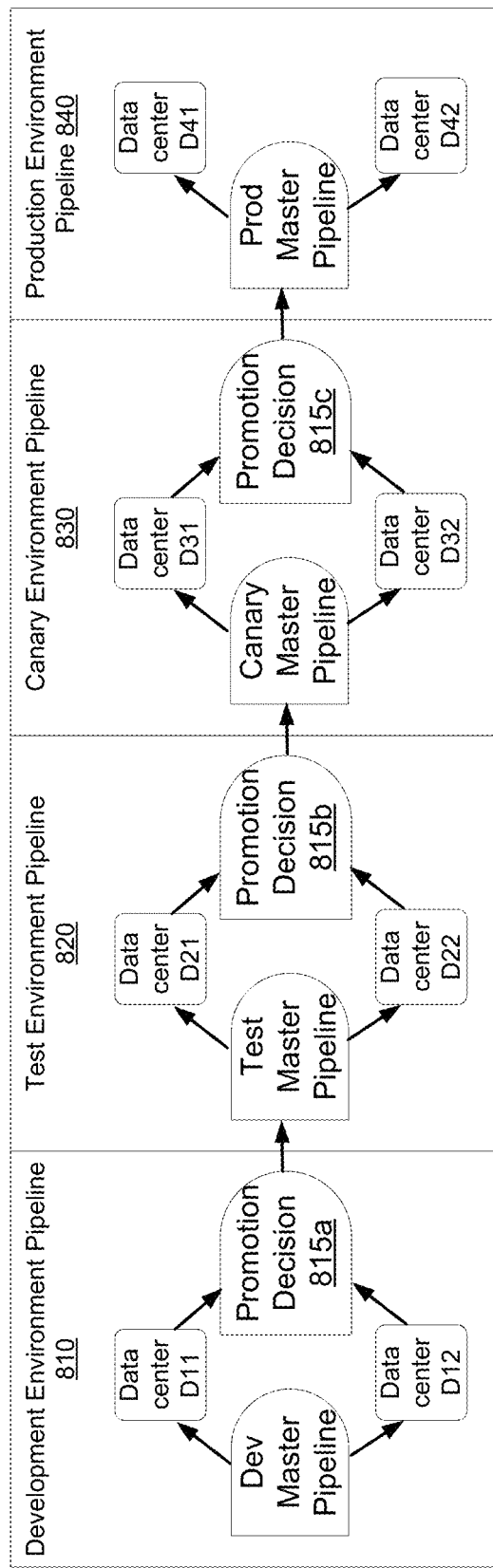
FIG. 8 illustrates an example master pipeline according to an embodiment.

FIG. 8 illustrates an example master pipeline 800 according to an embodiment. A master pipeline represents a sequence of stages that represent progressive conditional deployment across various data center environments. FIG. 8 shows stages for different environments of data center including development environment, test environment, canary environment, and production environment. Each stage further represents a pipeline that is executed for that stage. Accordingly, the master pipeline 800 includes a development environment pipeline 810 which feeds into a test environment pipeline 820, which feeds into a canary environment pipeline 830, which feeds into production environment pipeline 840.

The pipeline at each stage is a hierarchical pipeline comprising lower level pipelines. For example, the development environment pipeline 810 comprises a development master pipeline that feeds into data center pipelines D11, D12, . . . , depending on the number of data centers specified as having development environment in the declarative specification of the data centers.

The test environment pipeline 820 comprises a test master pipeline that feeds into data center pipelines D21, D22, . . . , depending on the number of data centers specified as having test environment in the declarative specification of the data centers.

The canary environment pipeline 820 comprises a canary master pipeline that feeds into data center pipelines D31, D32, . . . , depending on the number of data centers specified as having canary environment in the declarative specification of the data centers.

The production environment pipeline 820 comprises a production master pipeline that feeds into data center pipelines D21, D22, . . . , depending on the number of data centers specified as having test environment in the declarative specification of the data centers.

Each environment pipeline 810, 820, 830 includes a promotion decision pipeline 815a, 815b, 815c respectively. The outputs of the data center pipelines of the environment pipeline are collected by the promotion decision pipeline 815 that determines whether the software artifact is ready for promotion to the next stage. The promotion decision pipeline 815 may determine based on test case results obtained by the data centers whether the software artifact for the service is promoted to the next stage. For example, if more than a threshold test cases are passed, the promotion decision pipeline 815 promotes the software artifact to the next stage. The last environment stage, for example, the production environment pipeline may not have a promotion decision pipeline since there is no subsequent stage to which the software artifact needs to be promoted. As shown in FIG. 8, the promotion decision pipeline 815a of development environment pipeline determines whether to promote the software artifact from development stage to test stage; the promotion decision pipeline 815b of test environment pipeline determines whether to promote the software artifact from test stage to canary stage, and the promotion decision pipeline 815c of canary environment pipeline determines whether to promote the software artifact from canary stage to production stage.

A master pipeline comprises multiple pipelines, for example, a provisioning pipeline for provisioning resources of the target cloud platform and a deployment pipeline for deploying a software artifact on a data center entity. Each pipeline comprises a sequence of stages, each stage representing one or more actions that need to be performed by the target cloud platform towards provisioning and deploying of the data center. The data center generation module 210 generates detailed pipelines for deploying versions of software artifacts on data center entities.

In an embodiment, the pipeline generator module 320 generates detailed pipelines using pipeline templates that include variables. A pipeline template is converted into a pipeline by providing specific values of the variables in the pipeline. The process of generating a pipeline from a template is referred to as hydration of the pipeline template. A pipeline template contains templating expressions used as placeholders for actual values used in the deployment. For example, a templating expression may be replaced by target specific parameter values or expressions. Multiple pipeline instances may be generated by hydrating the pipeline template for different targets. The template variables represent parameters that may be replaced with specific values for a given target to generate a pipeline instance specific to that target. For example, a template variable "account_id" may be replaced with an actual value of account_id, for example, "12345" during hydration.

In one embodiment, the pipeline generator module 320 generates pipelines in a hierarchical fashion based on the hierarchy of the data center entities of the data center. For example, the data center comprises data center entities of different types including data centers, service groups, services, and so on. A data center entity may include one or more child data center entities. For example, a data center includes one or more service groups as child data center entities. A service group includes one or more services as child data center entities. Accordingly, the data center generation module 210 starts at a data center entity at a level of the hierarchy and generates pipelines of data center entities below that level. For example, the pipeline generator module 320 starts at the data center level and generates pipelines for service groups within the data center. For each service group, the pipeline generator module 320 generates pipelines for services within the service group.

The process for executing pipelines according to one embodiment is as follows. The software release deployment module 230 receives a request to deploy a software artifact on a set of data center entities in the target cloud platform. The software release deployment module 230 executes the master pipeline for one or more data centers. The software release deployment module 230 executes the aggregate pipelines for each service group of each data center. The aggregate pipeline comprises pipelines for services within the service group. For each service within each service group, the pipeline is executed by executing all the stages of the pipeline. The execution of the provisioning pipelines results in provisioning of the resource for a service and the deployment pipeline causes deployment of the service in the target cloud platform.

Figure 9:
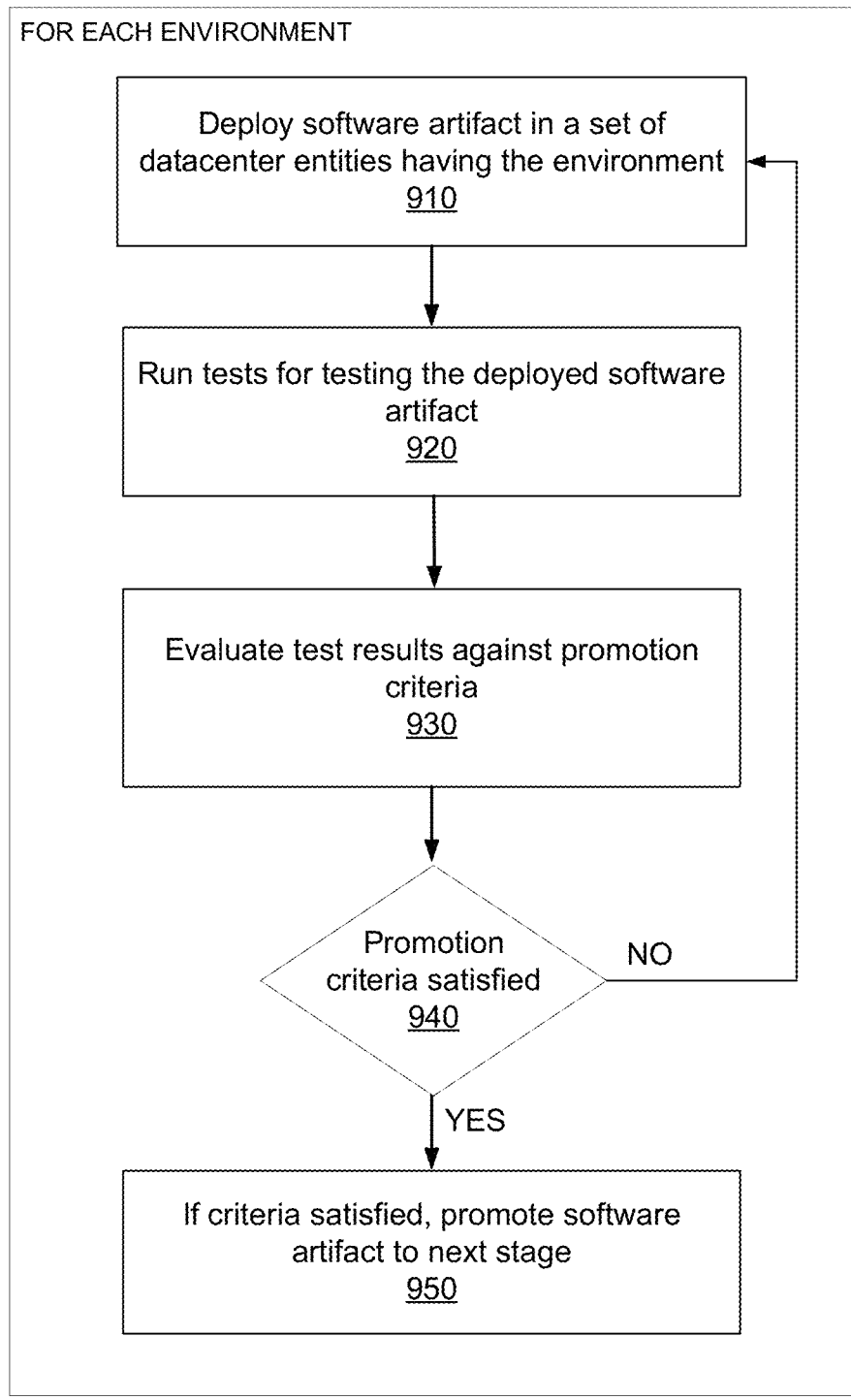
FIG. 9 shows the overall process executed by a stage for an environment of the master pipeline on a cloud platform according to an embodiment.

FIG. 9 shows the overall process executed by a stage for an environment of the master pipeline on a cloud platform according to an embodiment. The steps 910, 920, 930, 940, and 950 may be performed by each environment pipeline 810, 820, 830. The production environment pipeline 3 may execute only steps 910 and 920. The steps shown in FIG. 9 may be performed for one service or for multiple services specified using a manifest file.

The environment pipeline for an environment E includes instructions to deploy 910 the software on a set of data center entities, for example, a set of data center entities specified as having the environment E. In an embodiment, the software artifact is generated by compiling source code for a service. The source code may be obtained from a version control software. The set of data center entities may include data center instances, service groups, cells, services, or any combination of these.

The environment pipeline for the environment E further includes instructions for running 920 tests for testing the deployed software artifact on the set of data center entities. The environment pipeline for the environment E further includes instructions for evaluating 930 the test results against promotion criteria, for example, using the promotion decision pipeline 815. If the promotion criteria are not satisfied, the steps 910, 920, 930, and 940 may be repeated using a revised software artifact, for example, a software artifact generated from source code that includes fixes for certain defects identified during the testing 920. The environment pipeline for the environment E further includes instructions for proceeding 950 to the next stage if the promotion criteria are satisfied.

In an embodiment, the master pipeline comprises a hierarchy of pipelines. The hierarchy comprises multiple levels and pipelines at a particular level include pipelines of the next lower level as children pipelines. For example, at the highest level of hierarchy the master pipeline includes a release master pipeline that deploys a set of services related to a product. The next level of hierarchy includes service master pipelines that represent al deployments of a particular service across various environments. The next level of hierarchy may include service group master pipelines followed by service master pipelines.

Figure 10:
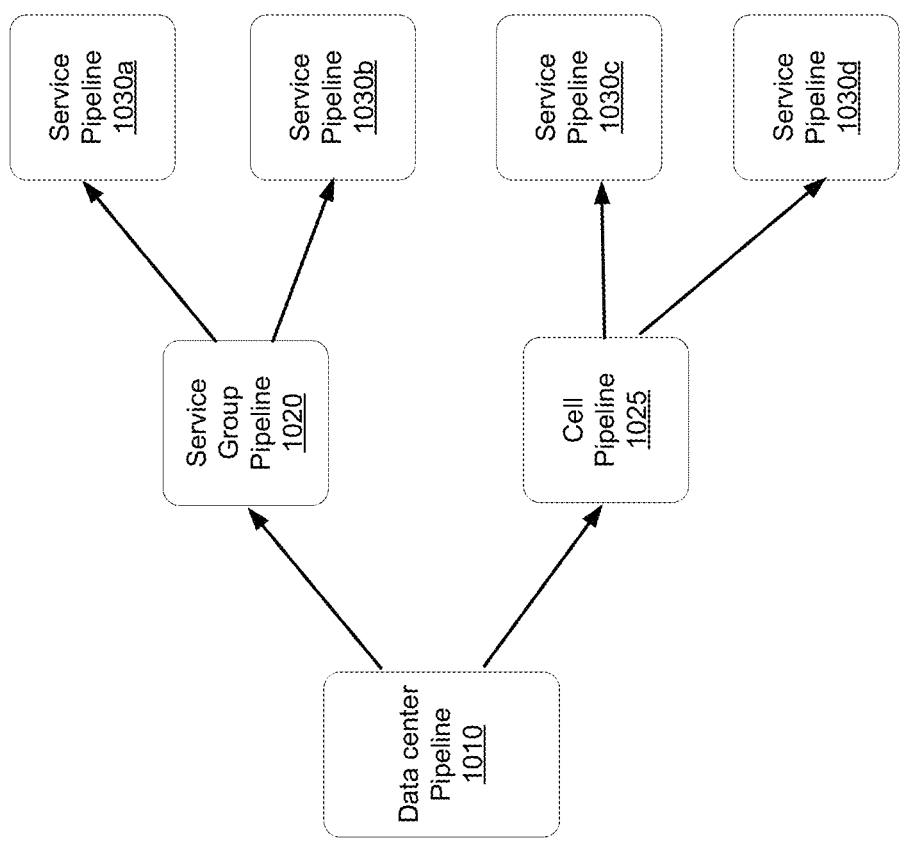
FIG. 10 shows an example master pipeline according to an embodiment.

FIG. 10 shows an example master pipeline according to an embodiment. The master pipeline is a hierarchical pipeline where each stage of a pipeline may comprise a pipeline with detailed instructions for executing the stage. The master pipeline hierarchy may mirror the data center hierarchy. For example, the top level of the master pipeline represents a sequence of stages for different environments. Each environment may include one or more pipelines for data center instances or pipelines for other types of data center entities. A data center instance pipeline 1010 may include service group pipelines 1020. Each service group pipeline 1020 may include one or more service pipelines 1030. A data center instance pipeline 1010 may include cell pipelines 1025, each cell pipeline 1025 comprising one or more service pipelines 1030. The service pipeline 1030 may comprise stages, each stage representing a pipeline representing instructions for deploying the service for specific environments. The lowest level pipeline or the leaf level pipeline in the hierarchy is referred to as a unit pipeline and may include detailed service specific instructions for performing an operation related to a service. For example, deployment for a service may include pre-deployment steps, deployment steps, post deployment steps, and post deployment test and validation step. A pipeline that is not a leaf level pipeline and has one or more child pipeline is an aggregate pipeline that orchestrates executions of the child pipelines.

A master pipeline may be driven by pull requests that occur a version control system for software receives a request for considering changes committed to an external repository for inclusion in a project's main repository. Accordingly, the master pipeline is automatically triggered when a pull request is received and deploys a software artifact based on the latest software version for which the pull request is received. The master pipeline performs continuous delivery of software artifacts based on pull requests. The master pipeline may be driven based on an on-demand manner, for example, by invoking a request using application programming interface (API) of the deployment module 210. The on-demand deployment based on master pipelines may be requested for any set of services and for any version for a given service as specified using the API. The master pipeline may be invoked to request a rollback from the current version to a previous version or a rollforward from the currently deployed version to a more recent version.

In an embodiment, the deployment module 210 creates a service master pipeline for each service. These pipelines get triggered when a pull request is received for a repository of the software. The deployment module 210 receives pipeline templates from users for specific services. These pipeline templates include detailed instructions for testing, validation, build, etc. for specific services. The data center generation module 220 receives a cloud platform independent declarative specification for one or more data centers. The data center generation module 220 generates (or configures) data centers according to the received cloud platform independent declarative specifications. The deployment module

210 receives promotion decision 815 pipelines. The promotion decision 815 pipelines are integrated into the overall master pipeline.

The pipeline generator creates all pipelines for each data center from the templates and combines them via master pipelines in a hierarchical fashion, for example, as illustrated in FIG. 10. In an embodiment, the pipeline generator generates service pipelines for individual services; the pipeline generator generates cell master pipelines to invoke the service pipelines; the pipeline generator generates service group master pipelines to invoke cell master pipelines; the pipeline generator generates data center instance master pipelines to invoke service group pipelines; the pipeline generator generates a service master pipeline to invoke the data center instance master pipelines.

Following is a snippet of a master pipeline showing various stages. Each stage may specify attributes including a stage name, a type of pipeline, a stage type (e.g., master deployment pipeline or promotion pipeline), prior stages, and so on.

```
{
  "stages": [
    {
      "stage_name": "Artifact version map for service SVC",
      "stage_type": "version_map",
      "prior_stage_ids": [ ]
    },
    {
      "pipeline_type": "env-type-aggregate",
      "template_name": ""deploy_dev.j2"",
      "stage_name": "Deploy to dev env",
      ""stage_type": "master_deployment_pipeline",
      "prior_stage_ids": [  " Artifact version map for service SVC"  ]
    },
    {
      "proote_to": "test",
      "template_name": "promote.j2",
      "pipeline_type": "promotion",
      "stage_name": "Promote to test env",
      "stage_type": "promotion",
      "prior_stage_ids": [   "Deploy to dev env"   ]
    },
    {
      "pipeline_type": "env-type-aggregate",
      "template_name": "deploy_test.j2",
      "stage_name": "Deploy to test env",
      "stage_type": "master_deployment_pipeline",
      "prior_stage_ids": [   "Promote to test env"   ]
    },
    {
      "promote_to": "stage",
      "template_name": "promote.j2"",
      "pipeline_type": "promotion",
      "stage_name": "Promote to staging env",
      "stage_type": "promotion",
      "prior_stage_ids": [   "Deploy to tes env"   ]
    },
    {
      "promote_to": "stage",
      "template_name": "promote.j2",
      "pipeline_type": "promotion",
      "stage_name": "Promote to staging env",
      "stage_type": "promotion",
      "prior_stage_ids": [   "Deploy to test env"   ]
    } ...
```

As shown in the examiner master pipeline, the first stage is an artifact version map. The next stage is a master deployment pipeline for deploying to development environment. The next stage is a promotion pipeline for determining whether the software artifact can be promoted to the next stage. The next stage is a master deployment pipeline for deploying to test environment. The next stage is a promotion pipeline for determining whether the software artifact can be promoted to the next stage that is staging environment.

Software Artifact Version Map

In an embodiment, the deployment module 210 receives an artifact version map that associates various software artifacts and their versions with data center entities. The artifact version map provides a declarative specification of the specific versions of software artifacts that need to be deployed for services in different data center entities. Each data center entity may be uniquely identified based on its location within the data center hierarchy as specified by the declarative specification of the data center. For example, for a service, a software library may act as a software artifact. The software artifact may have multiple versions, for example, V1, V2, V3, and so on. The artifact version map may specify that version V1 needs to be deployed in data center entities C1 and C2 and version V2 needs to be deployed in data center entities C3 and C4. The deployment module 210 generates master pipelines and instructions that ensure that the appropriate software artifact versions are deployed in the data center entities as specified in the artifact version map.

In an embodiment, the artifact version map is specified as a JSON (Javascript object notation) file, a YAML file, or a file using any other syntax for representing nested objects. The artifact version map may comprise a set of <service>: <version> key pairs that are associated with various data center entities distributed across a hierarchy of a data center. The artifact version map key pairs act as whitelists for corresponding pipelines. If a key for a service is not included into an artifact version map, all pipelines for that service are excluded during execution of the pipeline. Different artifact version maps may be applied to the same master pipeline resulting in different services being included/excluded during execution of the master pipeline.

Following is an example artifact version map. The artifact version map specifies environment types using the attribute "env_types". In the following example, the environment type development is specified. The environment type may include one or more data center instances; a data center instance may include one or more service groups, a service group may include one or more services. In the following example, the software artifact name is specified as library1 and version as version1 and is associated with the service instance instance001. However, the software artifact name and version may be associated with any level of data center entity in the hierarchy. For example, of the software artifact name and version is specified or a service group, the software artifact name and version is applicable to all services within the service group unless the software artifact name and version is overridden with different values of the software artifact name and version specified for a particular service instance within the service group. Similarly, the software artifact name and version can be specified for a data center instance and is applicable to all service groups or cells within the data center instance unless an overriding value is specified for a service group.

```
{
  "name": "artifact_version_map1",
  "schema_version": "0.1",
  "release_label": "release1.1",
  "deployments": {
    "env_types": [
      {
        "name": "development",
```

```
"data_center_instances": [
  {
    "name": "data center1",
    "service_group": [
      {
        "name": "service_group1",
        "services": [
          {
            "service_instance": "instance001",
            "name": "service1",
            "versions": [
              {
                "software_artifact_name": "library1",
                "version": "version1"
              }
            ]
          }
        ]
      }
    ]
  }
],
}
```

In an embodiment, the artifact version map specifies a data center entity using a full path of the data center entity, for example, "stagger_group1/data center1/service_group2/service1". In an embodiment, the artifact version map specifies a set of data center entities using regular expressions in the full path of the data center entity. For example, a full path that includes service_group[?] includes service_group1, service_group2, service_group3, and so on.

Following is an example of an artifact version map specifying regular expressions to define a set of services. The environment types are specified as dev and test and the data center entities in the full path including data center instances and service groups are specified as wildcards and service instances are specified as "service*". Accordingly, for all data center instances for dev and test environments, for all service groups, for services names matching service*, the version V1 of application app1 will be deployed.

```
env_types:
  - name: "dev | test"
    data_center_instances:
      - name: "(.*)"
        service_group:
          - name: "(.*)"
            services:
              - service_instance: "service*"
                name: "app1"
                versions:
                  version: "V1"
```

In some embodiments, the artifact version map may specify parameters used by pipelines. Accordingly, the specified parameters will be applicable to a stagger group for which the parameter is specified.

Figure 11:
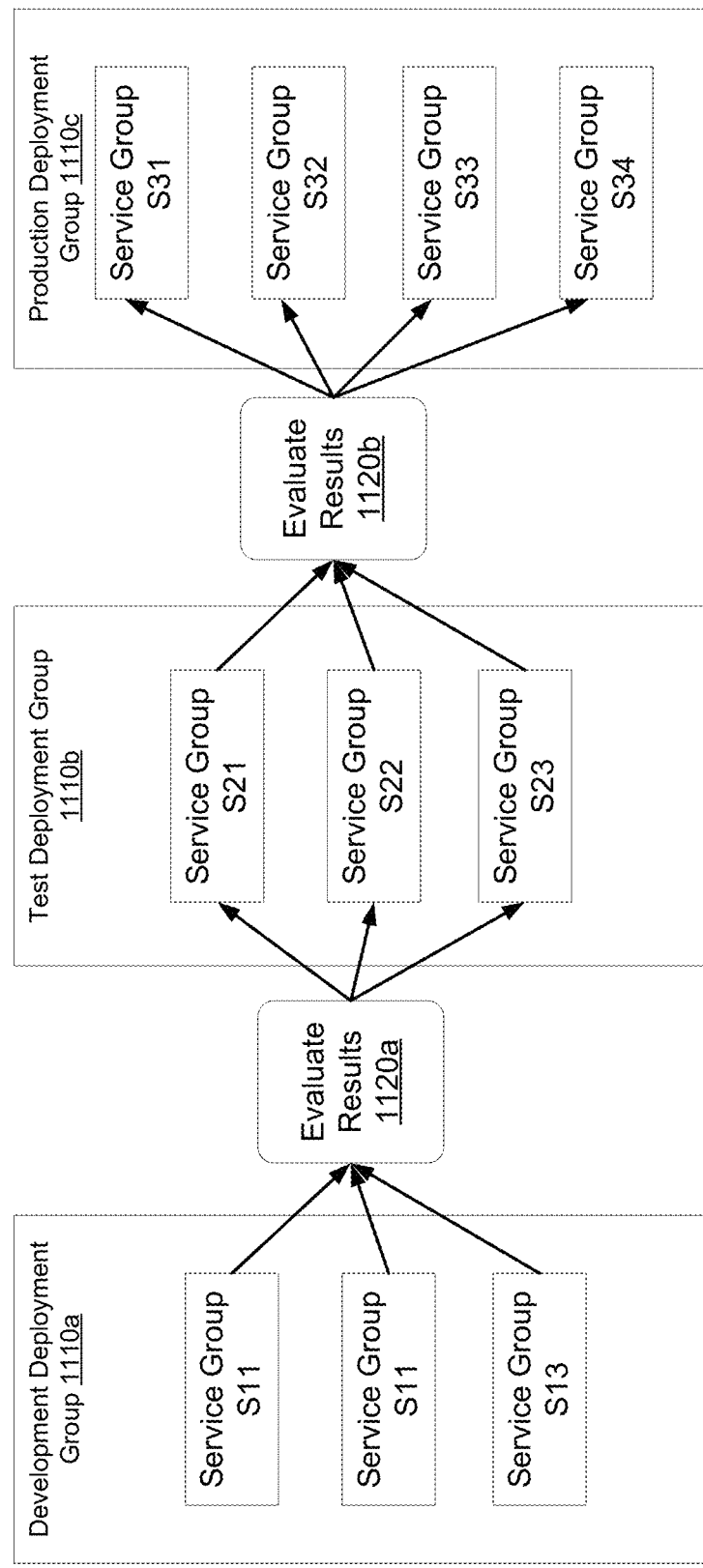
FIG. 11 shows an example master pipeline for a data center according to an embodiment.

FIG. 11 shows an example master pipeline for a data center according to an embodiment. As shown in FIG. 11, master pipeline is executed over a deployment group (also referred to as a stagger group) referring to collections of data center entities as defined by a declarative specification. The artifact version map may specify a stagger group attribute to define a set of data center entities that may be associated with a specific artifact version. A data center entity may be identified by specifying a path from a root node in a hierarchy of a data center, for example, the data center instance. As shown in FIG. 11, the master pipeline defines various stages for different environments. Each stage performs actions on a set of data center entities referred to as deployment group 1110. FIG. 11 shows a development deployment group 1110a comprising data center entities including service groups S11, S12, and S13; a test deployment group 1110b comprising data center entities including service groups S21, S22, and S23; and a production deployment group 1110b comprising data center entities including service groups S31, S32, S33, and S34. Results of testing on the data center entities of the development deployment group 1110a are evaluated 1120a to determine whether the software artifacts tested in the development deployment group 1110a are promoted to the test deployment group 1110b. Similarly, results of testing on the data center entities of the test deployment group 1110a are evaluated 1120b to determine whether the software artifacts tested in the test deployment group 1110a are promoted to the production deployment group 1110c.

Figure 12:
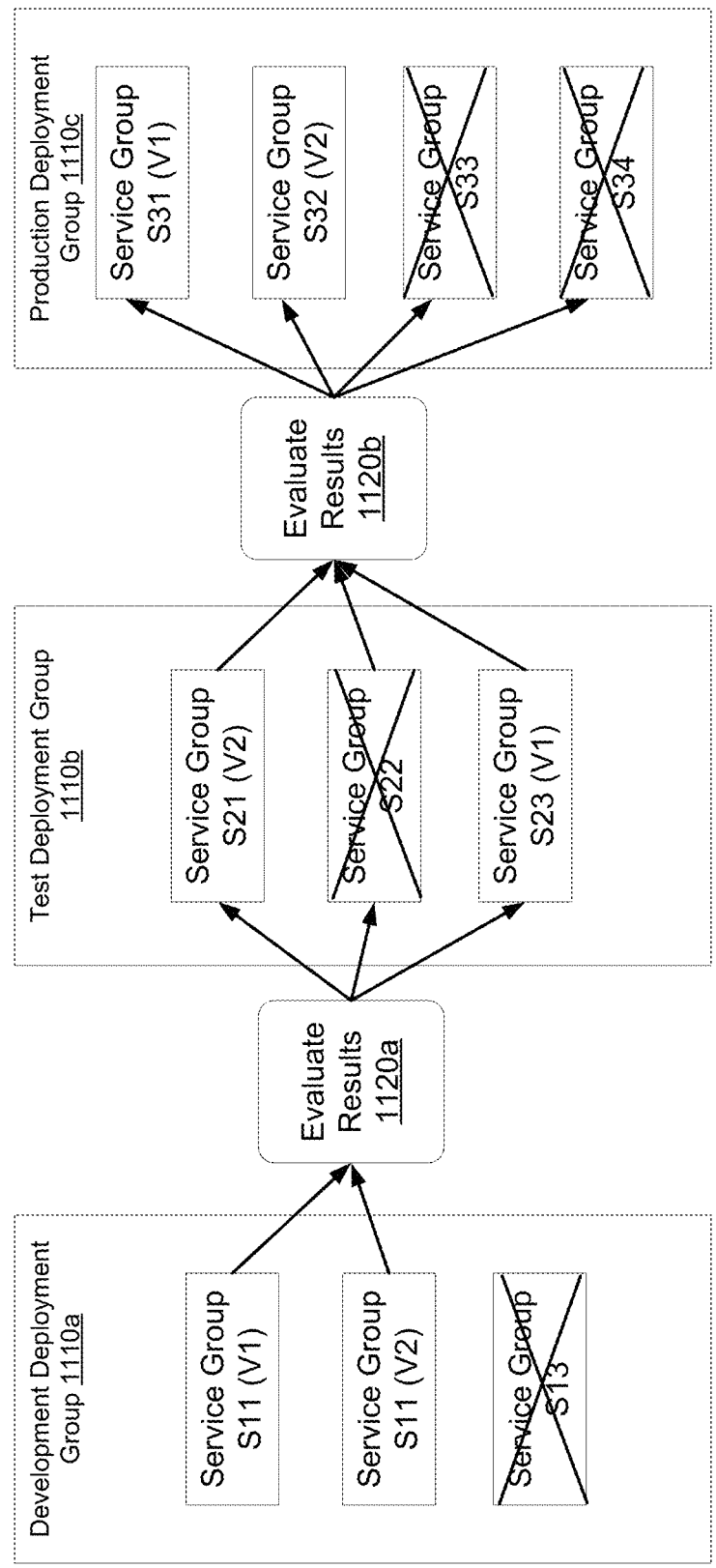
FIG. 12 illustrates how the execution of the master pipeline is modified based on an artifact version map according to an embodiment.

FIG. 12 illustrates how the execution of the master pipeline is modified based on an artifact version map according to an embodiment. The artifact version map associates versions of software artifacts with data center entities. The system modifies the detailed pipelines executed on the data center entities to ensure that actions related to the appropriate versions of software artifacts are performed on each data center entities. For example, FIG. 12 shows versions V1 and V2 of a software artifact for a service SVC1. Version V1 is associated with service groups S11, S23, and S31 and version V2 is associated with service groups S11, S21, and S32. Assume that the master pipeline is deploying versions of the service SVC1 on the data center. Accordingly, the system modifies the pipeline executed to deploy the version V1 on service groups S11, S23, and S31 and version V2 on service groups S11, S21, and S32. In an embodiment, the system introduces a version map filter before stages of the master pipeline shown in FIG. 11. The execution of the master pipeline selects the versions of software artifacts for each data center entity based on the version map filter. For example, the version map filter includes instructions to skip service groups S13, S22, S33, and S34 for this particular action. The version map filter specifies that version V1 is deployed on service groups S11, S23, and S31 and version V2 is deployed on service groups S11, S21, and S32.

FIG. 13 shows the overall process for deployment of software artifacts on data centers configured on a cloud platform according to an embodiment. The data center generation module generates 1310 one or more data centers on a target cloud platform. Each data center is generated from a cloud platform independent declarative specification and has a hierarchy of data center entities.

The software release management module 230 receives as input, an artifact version map that maps data center entities to versions of software artifacts. The software release management module 230 also receives 1330 as input, a cloud platform independent master pipeline.

The software release management module 230 compiles 1340 the cloud platform independent master pipeline in conjunction with the artifact version map to generate a cloud platform specific detailed pipeline. In an embodiment, the generated cloud platform specific detailed pipeline includes artifact version map filters before certain stages to determine whether certain stages should be enabled or disabled according to the artifact version map.

The software release management module 230 further receives 1350 code for releasing one or more features of services deployed on the data center. For example, the code may represent source code obtained from a version control management system storing source code repositories to which changes are submitted by developers. The software release management module 230 executes 1360 the cloud platform specific deployment pipeline to deploy software artifacts based on the received code.

Implementing Idempotency in Execution of Pipeline

The system according to various embodiments implements idempotency in execution of pipelines, for example, master pipelines or aggregate pipelines. An aggregate pipeline is associated with a data center entity. A stage of an aggregate pipeline for a data center entity D1 represents pipelines of various data center entities below the data center entity D1 in the hierarchy of the data center as defined by the declarative specification of the data center. For example, data center entity D1 may represent an environment that comprises multiple data center entities representing service groups, each service group comprising a set of services, and so on. Accordingly, an aggregate pipeline for the data center entity D1 represents various pipelines corresponding to the other data center entities below data center entity D1 in the hierarchy. The deployment manifest determines which of these pipelines are active during a particular execution. For example, a software artifact may be deployed in a subset of the services of a service group.

If a failure occurs in any stage of any of these pipelines corresponding to the data center entities below the data center entity D1 in the hierarchy, the corresponding stage of the aggregate pipeline for the data center entity D1 indicates a failure. Once a failure occurs, conventional techniques require manual intervention followed by restart of the aggregate pipeline for the data center entity D1. Conventional pipelines are stateless. As a result, restart of the aggregate pipeline causes all the stages of the pipeline to be executed again, whether or not they executed successfully during the previous execution of the pipeline. Executing a stage that previously executed successfully results in waste of computing resources.

A large system such as a multi-tenant system shown in FIG. 1 may configure a large number of data centers in the cloud platforms. For example, each tenant may configure one or more data centers. As a result, such a system may generate a very complex pipeline, for example, a master pipeline that invokes several thousand smaller pipelines corresponding to data center entities at different levels of hierarchy. Furthermore, the chances of a failure occurring in such a pipeline are very high since a large number of stages are executing. Re-executing such a complex pipeline for every failure can be very wasteful in terms of resources. Furthermore, the failure may occur again during subsequent executions as well as other failures may occur in other stages or other pipelines, thereby causing the entire pipeline to re-execute multiple times.

A system according to various embodiments tracks states of execution of various stages of the pipeline so that subsequent execution of a pipeline skips stages that previously executed successfully. Accordingly, the system implements idempotency in execution of stages of a pipeline since repeated execution of a pipeline has the same effect as a single execution. Accordingly, two consecutive executions of a pipeline have the same result as executing the pipeline once. However, if a stage fails during the first execution, the stage may execute successfully during the second execution, resulting in the second execution to make more progress in execution of the pipeline compared to the first execution.

A stage that fails during a first execution may execute successfully during the second execution, for example, since the system holds the execution for a threshold amount of time, thereby allowing a system administrator to make modifications that increase the likelihood of the failed stage completing execution successfully during subsequent runs of the pipeline. Alternatively, the system may execute certain remedial actions between subsequent executions of the pipeline thereby fixing issues that may be causing failures. Idempotency ensures that stages that executed successfully in the first run, skip execution during the second run.

The retry strategies according to various embodiments allow users such as service owners to take various actions in case of failures. The system according to various embodiments may: (1) Allow service owners to retry failing aggregate pipelines, without the need to push a new deployment manifest. (2) Allow service owners to provide the retry behavior configuration in their deployment manifest. (3) Allow service owners to pause a failing aggregate pipeline long enough, to try and fix the issue asynchronously, and subsequently resume the pipeline after the issue has been fixed. (4) Allow service owners to ignore aggregate pipeline failure before retrying, if the failure is unrecoverable, and continue with the rest of the execution flow. (5) Allow service owners to ignore aggregate pipeline failure after retrying, if the failure is unrecoverable, and continue with the rest of the execution flow.

FIG. 14 shows a system architecture of a retry module according to an embodiment. The retry module 350 comprises a retry execution module 1410, an idempotency module 1420, a pipeline execution state store 1430, and a retry strategy store 1440. Other embodiments may have more or fewer modules than those indicated in FIG. 14.

The idempotency module 1420 implements the logic for ensuring idempotency during execution of pipelines. The idempotency module 1420 manages states of execution of various stages during execution of a pipeline. The pipeline execution state store 1430 stores the state of execution of various stages during execution of pipelines. The pipeline execution state store 1430 maps a context for a stage to an execution status of the stage. The context of a stage is determined based on values of various attributes of the stage, for example, the inputs of the stage including the versions of various software artifacts, version of the deployment manifest, and so on. The execution status of a stage indicates whether the stage successfully executed in a previous execution of the pipeline. The execution status of a stage may also be referred to herein as the state of the stage.

In an embodiment, the pipeline execution status is obtained by invoking an API (application programming interface) of the pipeline execution engine 360. The pipeline execution engine 360 acts as the pipeline execution state store 1430 that allows the system to query the state of each stage by invoking the APIs. The system specifies a pipeline stage as a structure that represents various inputs, for example, the versions of software artifacts being deployed by the stage, version of the deployment manifest, attributes of the data center entity being targeted by the stage (for example, service instance name, cell name, service_group name, environment name, and so on), and version of the pipeline. Accordingly, the pipeline execution state store 1430 maps the representation of a stage that captures the state of the stage to an execution status of the stage based on any previous executions of the pipeline if available.

In an embodiment, the system determines a hash value based on a canonical representation of the structure that represents the inputs of the stage. The hash value may be a checksum based on numerical representation of various attributes of the stage. The system maps the hash value identifying the stage and its inputs to the execution status of the stage. The state representation of a data center entity D1 includes the state information of all data center entities that are below that data center entity in the hierarchy that are currently being actively targeted in the artifact version map. For example, the state information for data center entity D11 includes state information of data center entities D111 and D112, the state information for data center entity D12 includes state information of data center entities D121 and D122, and state information for data center entity D13 includes state information of data center entities D131 and D132. Similarly, the state information for data center entity D1 includes state information of data center entities D11, D12, and D13. This example assumes that all the data center entities mentioned above are being actively targeted in the artifact version map. Accordingly, the state (or the execution status) for any target at a given level of hierarchy is an aggregate of the states (or the execution status) of all the sub-targets under that target's level. The representation of a pipeline is canonical, such that ordering of stages that can be executed in parallel does not affect the state.

According to an embodiment, the idempotency module 1420 provides an interface to the pipeline execution state store 1430. Accordingly, the idempotency module 1420 allows the system to check whether a stage successfully completed execution during a prior run of a pipeline. This allows the system to determine whether to execute the stage in a current run of the pipeline.

The retry strategy store 1440 stores retry strategies for various data center entities in a hierarchy of data center entities. The retry execution module 1410 retries execution of a stage according to the retry strategy applicable. The details of the processes for retrying execution of pipeline stages are further described herein.

FIG. 15 shows the process for implementing idempotency during execution of a pipeline according to an embodiment. The steps described herein are indicated as being performed by the system and may be performed by the software release management module 230 or by any other module, for example, the retry module 350. An execution of a pipeline is also referred to as a run of the pipeline.

The system receives 1510 a pipeline configured to deploy software artifacts on a cloud platform. The pipeline may be a master pipeline generated by the pipeline generator module 320. The system may repeatedly execute the received pipeline. The system may repeat execution, for example, if an error is encountered in one of the stages of the pipeline during an execution of the pipeline. The system may repeat execution, for example, if the pipeline execution is stopped for any reason, for example, for manual intervention to fix certain issues with the system.

The system accesses the pipeline execution state store 1430 to access the status of various stages during the previous execution of the pipeline. The previous execution of the pipeline may be a partial execution in which only a subset of the stages of the pipeline completed execution successfully. The pipeline may be configured such that the execution of subsequent stages stops when one stage fails.

The subsequent execution of the pipeline is performed such that the system skips the execution of stages that executed successfully. As a result, the system executes only a subset of the stages of the pipeline in the subsequent execution, the subset including stages that did not complete successful execution in the previous run of the pipeline. The subsequent execution is performed by repeatedly performing the following steps 1520, 1530, 1540, 1550, and 1560.

The system selects 1520 a stage. Across the different iterations, the system selects the stages in an order in which the stages are sequenced in the pipeline, i.e., starting from the input of the pipeline and proceeding along the pipeline to the end of the pipeline.

The system determines 1530 a context for the stage based on inputs of the stage for the subsequent execution. The system accesses 1540 an execution status of the stage from the pipeline execution state store 1430. The system determines 1550 based on the execution status of the stage, whether to select the stage as a candidate stage for the subsequent execution of the pipeline or whether to skip the stage during the subsequent execution of the pipeline. The system executes 1560 the stage if the stage is selected as a candidate stage for the subsequent execution. If the system determines based on the execution status of the stage that the stage should be skipped, the system skips the execution of the stage and selects the next stage in the sequence as determined by the order of stages of the pipeline.

Figure 16A:
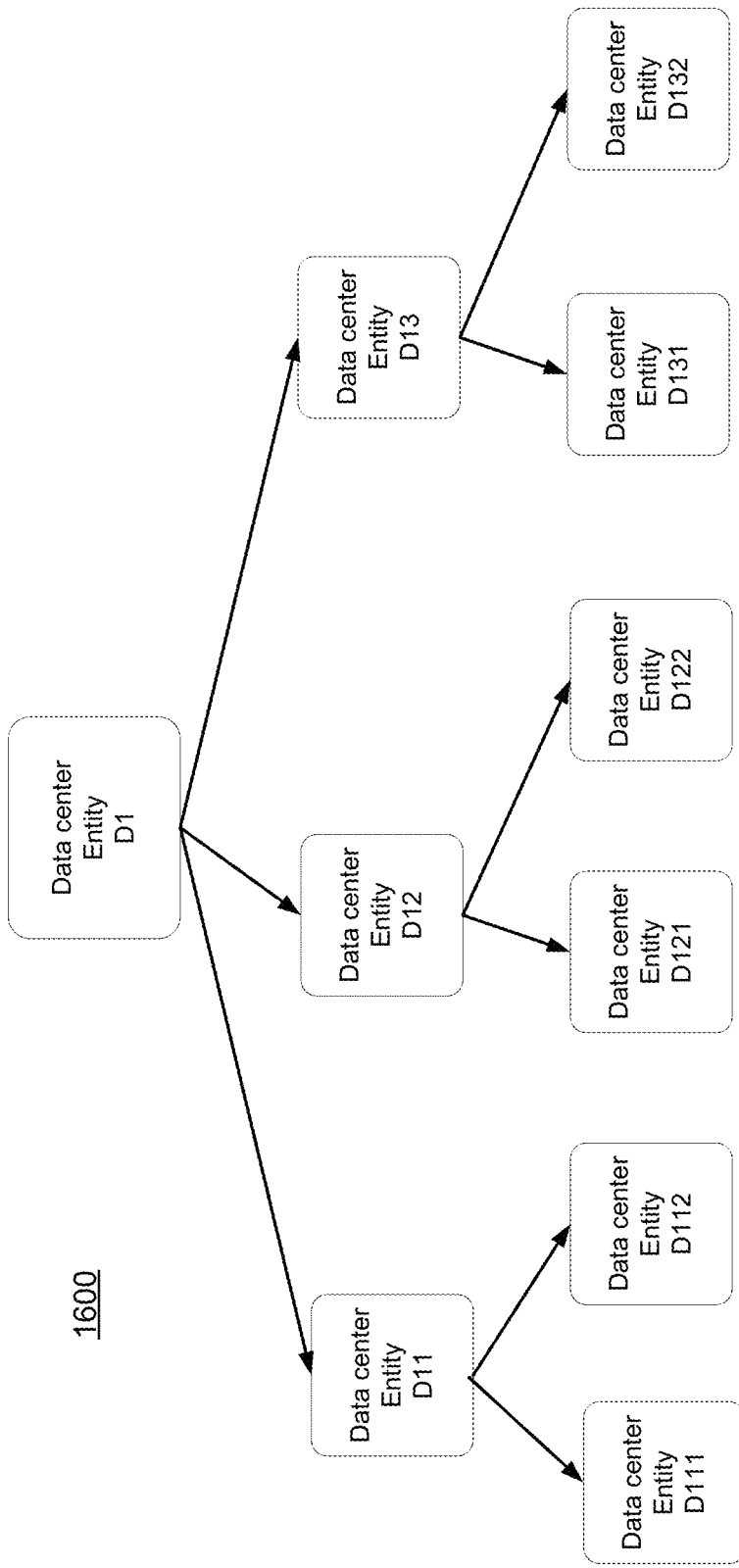

FIG. 16 shows an example data center configuration and corresponding aggregate pipelines according to an embodiment. FIG. 16A shows an example data center configuration with a hierarchy of data center entities. The data center 1600 includes a data center entity D1 at the top of the hierarchy. Below data center entity D1 are data center entities D11, D12, and D13. Below data center entity D11 are data center entities D111, D112; below data center entity D12 are data center entities D121, D122; and below data center entity D13 are data center entities D131, D132.

Figure 16B:
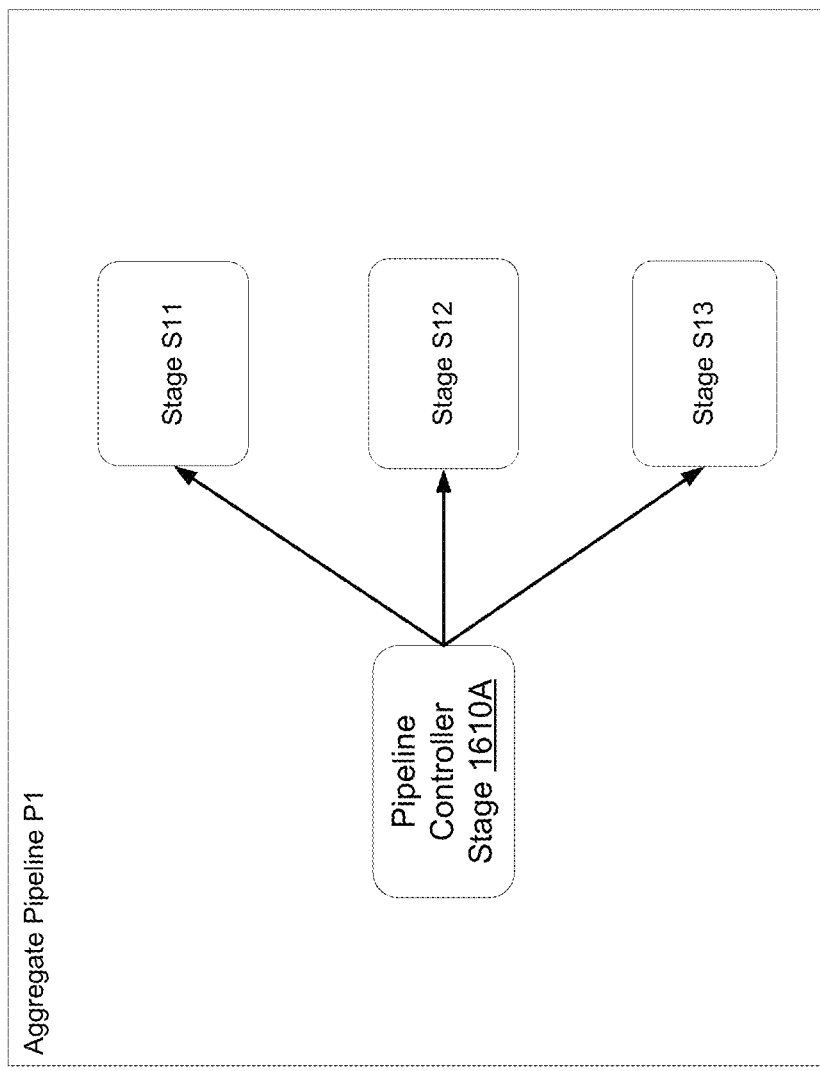

FIGS. 16B and 16C show examples of aggregate pipelines. FIG. 16B shows the aggregate pipeline P1 for data center entity D1. The aggregate pipeline P1 comprises three stages S11, S12, and S13 corresponding to data center entities D11, D12, and D13 respectively. Each stage S11, S12, and S13 represents a pipeline. For example, FIG. 16C shows a pipeline P11 corresponding to stage S11 and includes stages S111 and S112 corresponding to data center entities D111, D112. Similarly, pipeline P13 corresponds to stage S13 and includes stages S131 and S132 corresponding to data center entities D131, D132.

In some embodiments, the pipeline generator module 320 generates pipelines based on a declarative specification of a data center configured on a cloud platform and an artifact deployment manifest such that a generated pipeline includes a pipeline controller stage 1610. The pipeline controller stage 1610 may be included as the first stage of the pipeline, for example, pipeline controller stage 1610A is the first stage of the aggregate pipeline P1, pipeline controller stage 1610B is the first stage of the aggregate pipeline P11, and pipeline controller stage 1610C is the first stage of the aggregate pipeline P13.

The pipeline controller stage controls the execution of the stages of the pipeline. For example, the pipeline controller stage implements the version map filter described herein that determines which data center entities need to be targeted for specific software artifacts based on the artifact version map. Accordingly, the pipeline controller stage parses the artifact version map and determines which stages of the pipeline need to be executed. The pipeline controller stage ensures that the only stages that are executed correspond to data center entities that are being targeted in the artifact version map.

Furthermore, the pipeline controller stage includes instructions to check the status of the stages of the pipeline that are selected for execution and checks whether they were previously executed with the same inputs that are currently specified in the stages. The pipeline controller stage checks the pipeline execution state store 1430 for execution status of the stages during a previous execution. If the pipeline controller stage determines that a particular stage was successfully executed previously with matching inputs, the pipeline controller stage skips execution of that stage. As a result, the pipeline controller stage enforces idempotency in execution of the pipelines by allowing partial runs of the pipeline such that each subsequent run skips stages that previously completed execution successfully.

Figure 16D:
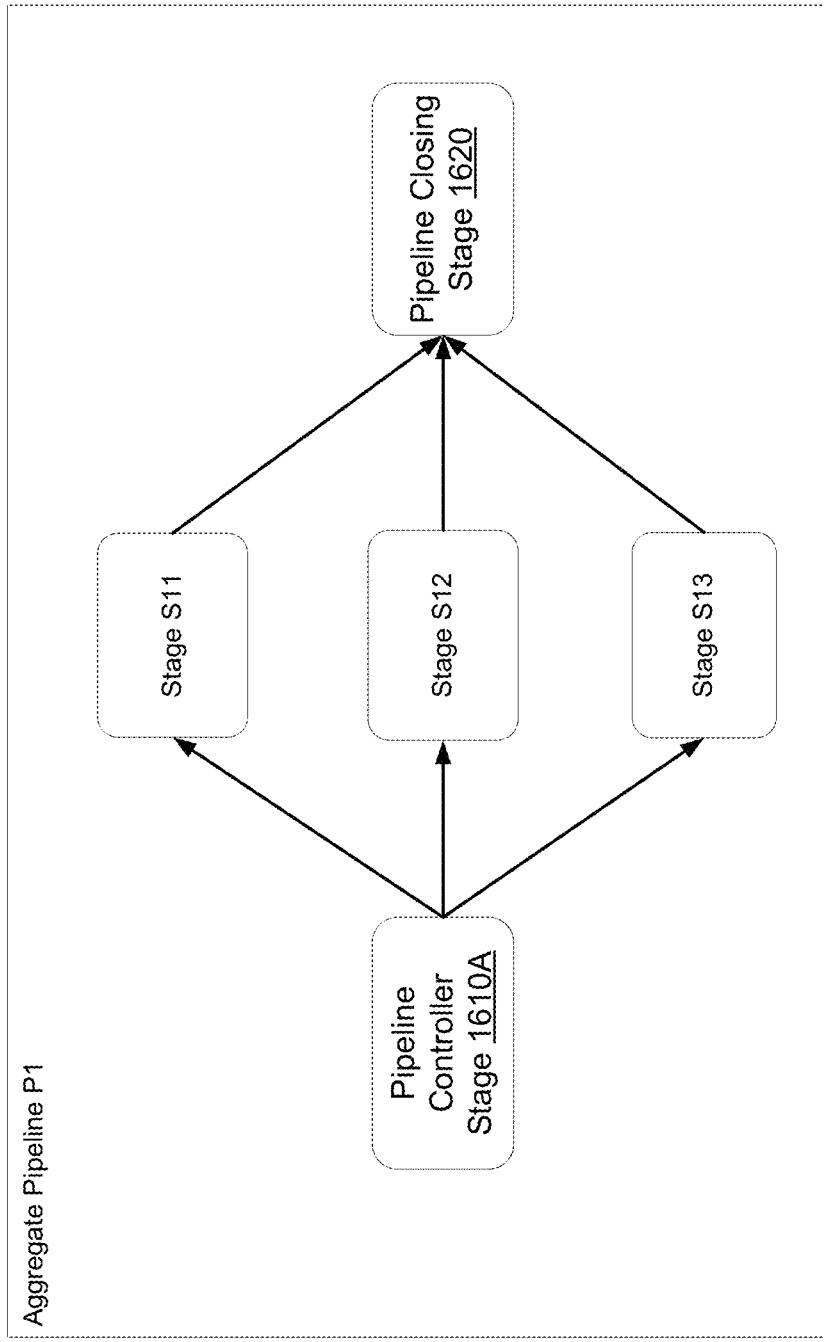

In some embodiments, the pipeline generator module 320 generates pipelines based on a declarative specification of a data center configured on a cloud platform and an artifact deployment manifest such that a generated pipeline includes a pipeline closing stage that is the last stage of the pipeline. FIG. 16D illustrates a pipeline with a pipeline closing stage according to an embodiment. The pipeline closing stage 1620 ensures that the status of execution of each stage of the pipeline that was executed during the current run of the pipeline is saved in the pipeline execution state store 1430 for access during subsequent runs of the pipeline.

Implementing Retry Strategies for Handling Failures in Execution of Pipeline

The artifact version map and master pipelines are used to orchestrate various types of operations related to continuous delivery of software artifacts in a cloud-based data center. The artifact version map and the master pipelines can be configured to perform aggregate retry operations for a service or a service group or any data center entity. The artifact version map includes configurations of retry operations for a data center entity, including the retry strategy, a threshold number of retries to perform in case of failure to execute a stage of a pipeline, whether confirmation from a user is required before retrying or retry is performed automatically, and so on. For example, a retry strategy may be a fixed backoff strategy that pauses execution for a fixed period of time before retrying. Other retry strategies may be configured using artifact version map and master pipelines. In an embodiment, the pipeline generator introduces an invoke retrier stage within an aggregate pipeline to trigger a retry strategy if a previous pipeline stage fails. The retry strategy and configuration parameters specified for a data center entity applies to all data center entities and services within the data center entity unless the value is overridden for a nested data center entity.

Figure 17:
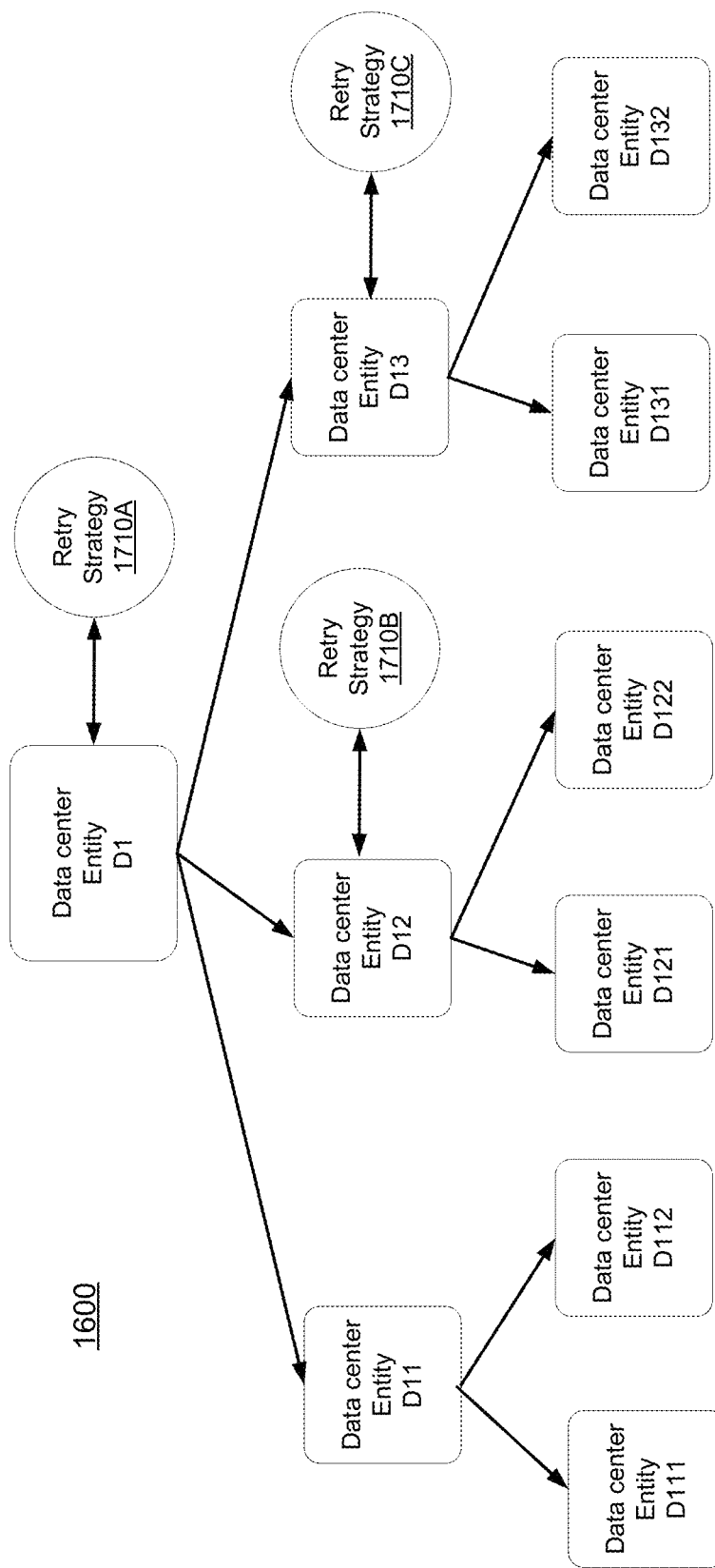
FIG. 17 illustrates retry strategies specified for execution of an aggregate pipeline according to an embodiment.

FIG. 17 illustrates retry strategies specified for execution of an aggregate pipeline according to an embodiment. The retry strategies are associated with data center entities of the hierarchy shown in FIG. 16A. A retry strategy may be associated with a data center entity declared in a hierarchy of a data center. As illustrated in FIG. 17, the retry strategy 1710A is associated data center entity D1, retry strategy 1710B is associated data center entity D12, and retry strategy 1710C is associated data center entity D13. The retry strategy associated with a data center entity is applied if there is any failure of a stage if an aggregate pipeline generated for that data center entity.

An aggregate pipeline generated for a data center entity represents pipelines for various data center entities below that data center entity. Accordingly, the retry strategy associated with that data center entity is invoked if there is any failure of any stage of any pipeline within the hierarchy of data center entities below that data center entity. For example, the retry strategy 1710B is invoked if there is any failure in the aggregate pipeline of data center entity D12, or pipeline of data center entities D121 and D122.

According to an embodiment, if a failure occurs in a data center entity, all the retry strategies associated with data center entities that are above that data center entity in the hierarchy are applied. For example, if a failure occurs in data center entity D121, the retry strategy 1710B is applied as well as the retry strategy 1710A since the corresponding data center entities D12 and D1 are above the data center entity D121 in the hierarchy. Similarly, if a failure occurs in data center entity D131, the retry strategy 1710C is applied as well as the retry strategy 1710A since the corresponding data center entities D13 and D1 are above the data center entity D131 in the hierarchy.

If a plurality of retry strategies are applicable to a data center entity, if the failure is fixed when the retry strategy of lowest applicable data center entity in the hierarchy is applied, the retry strategies of the remaining data center entities are not invoked since the failure is not propagated above in the hierarchy once the stage failure is addressed. If the failure to a stage of pipeline generated for a data center entity continues to persist, all retry strategies applicable to the data center entity are invoked.

Following is an example strategy specification. The specification includes a name attribute for the strategy (specified as "aggressive"), a type of strategy (specified as "fixed_backoff" that retries execution after a fixed size time interval), a retry_backoff_period that specifies the amount of time that the system delays before retrying, a max_attempts attribute that specifies the number of times the system will attempt to retry, and an ask_before_retry attribute that specifies whether the system needs a user approval before retry.

```
strategies:
    retries:
        - name: aggressive # free form name of the retry strategy
          strategy_type: fixed_backoff # strategy type
          retry_backoff_period: 300 # seconds
          max_attempts: 5 # provide a limit
          ask_before_retry: true # option to kick off retry manually
          after automated retries fail
```

The system associates specific retry strategies with data center entities using example specification as follows. The following specification identifies target data center entities where a particular retry strategy is applied. The specification identifies environment types or groups where the retry strategy is applicable. This allows the system to specify different retry strategies for different environment types, for example, the same data center entity may apply strategy S1 in the development environment but strategy S2 in the test environment and strategy S3 in the production environment. The name of the strategy is selected from one of the retry strategies defined, for example, a "fixed timeout" strategy. The specification further specifies an attribute datacenter_entities identifying the names of the data center entities to which the retry strategy is applied, for example, as D1 and D2.

```
targets:
    'env_types|stagger_groups':
        - name: dev
          retry_strategy: fixed_timeout
          datacenter_entities:
              - name: D1, D2
          ...
```

Retrying a stage of a pipeline uses the idempotency implementation as disclosed in FIGS. 15-16 and their description. For example, since a failure of a stage S1 of pipeline associated with a data center entity D1 could occur in a stage S1' of a pipeline associated with another data center entity D1' that is nested deep within the hierarchy, it is possible that several stages of several pipelines within the hierarchy below data center entity D1 are executed successfully before the stage S1' fails. If the execution of the stage S1 of the pipeline corresponding to datacenter entity D1 is retried, the idempotency of execution of the pipeline ensures that the stages that were successfully executed during the previous execution are not executed again during the retry.

Figure 18A:
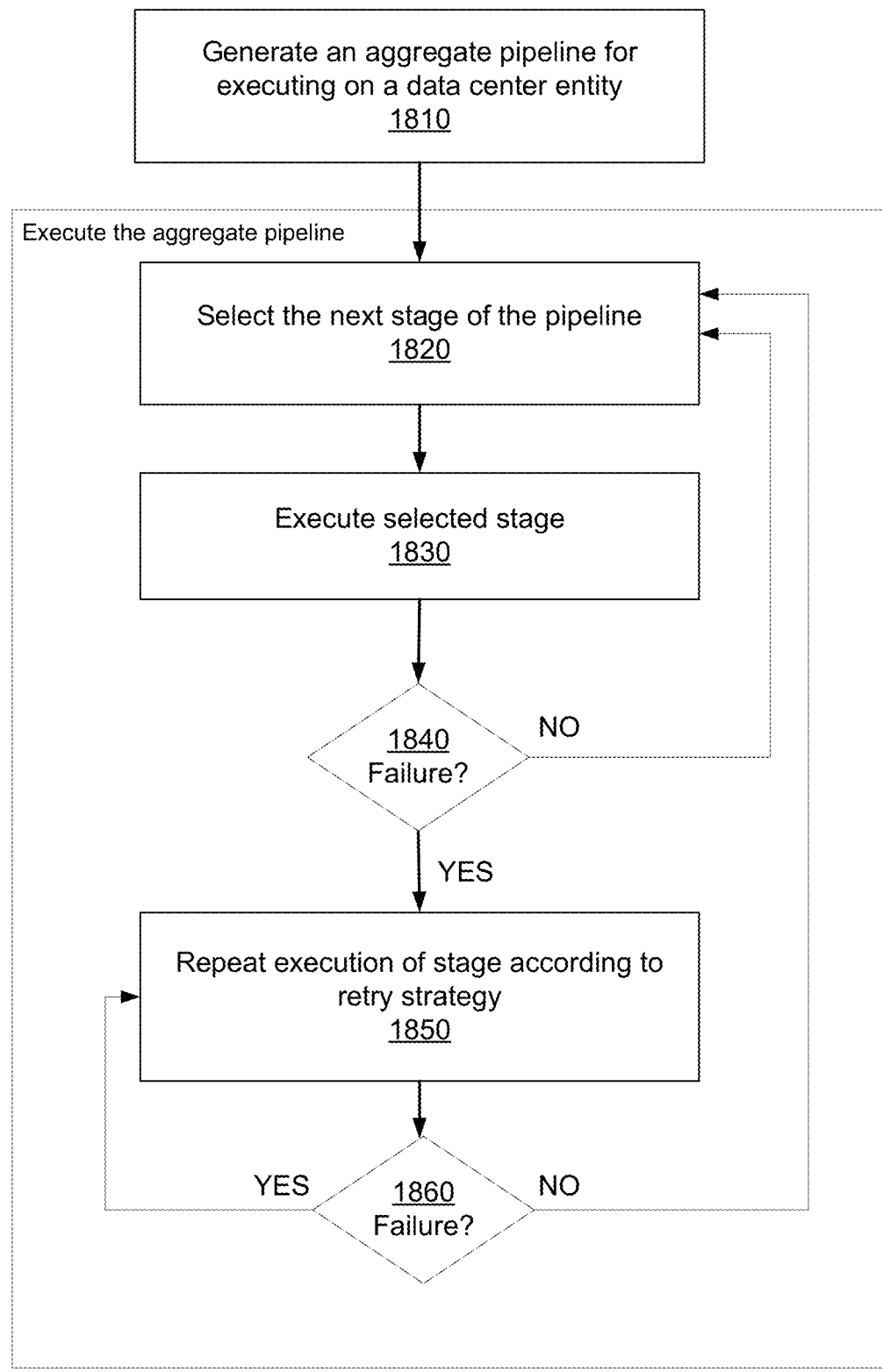
FIG. 18A-C shows various processes for implementing retry strategies during execution of a pipeline according to an embodiment.
Figure 18B:
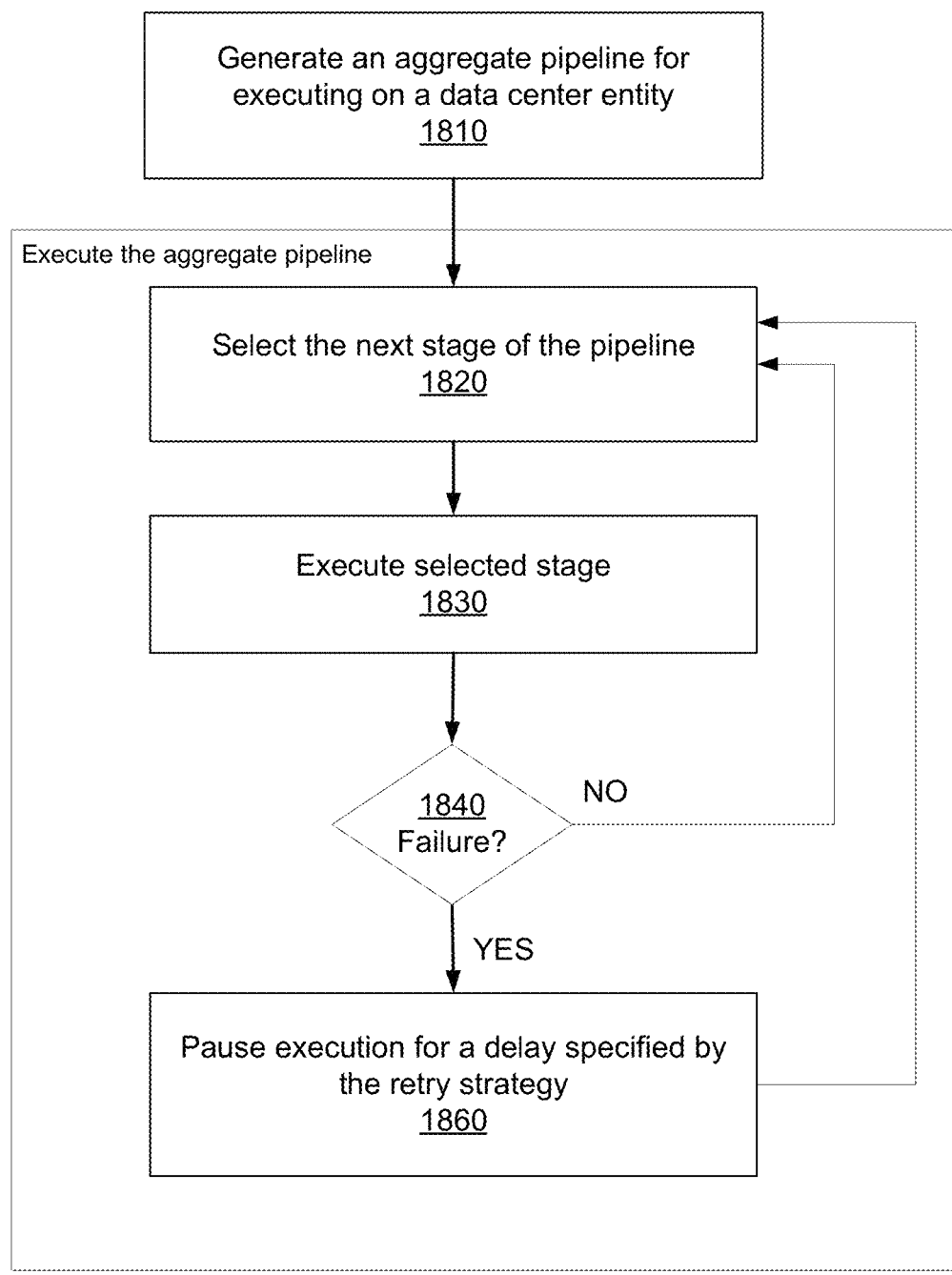
Figure 18C:
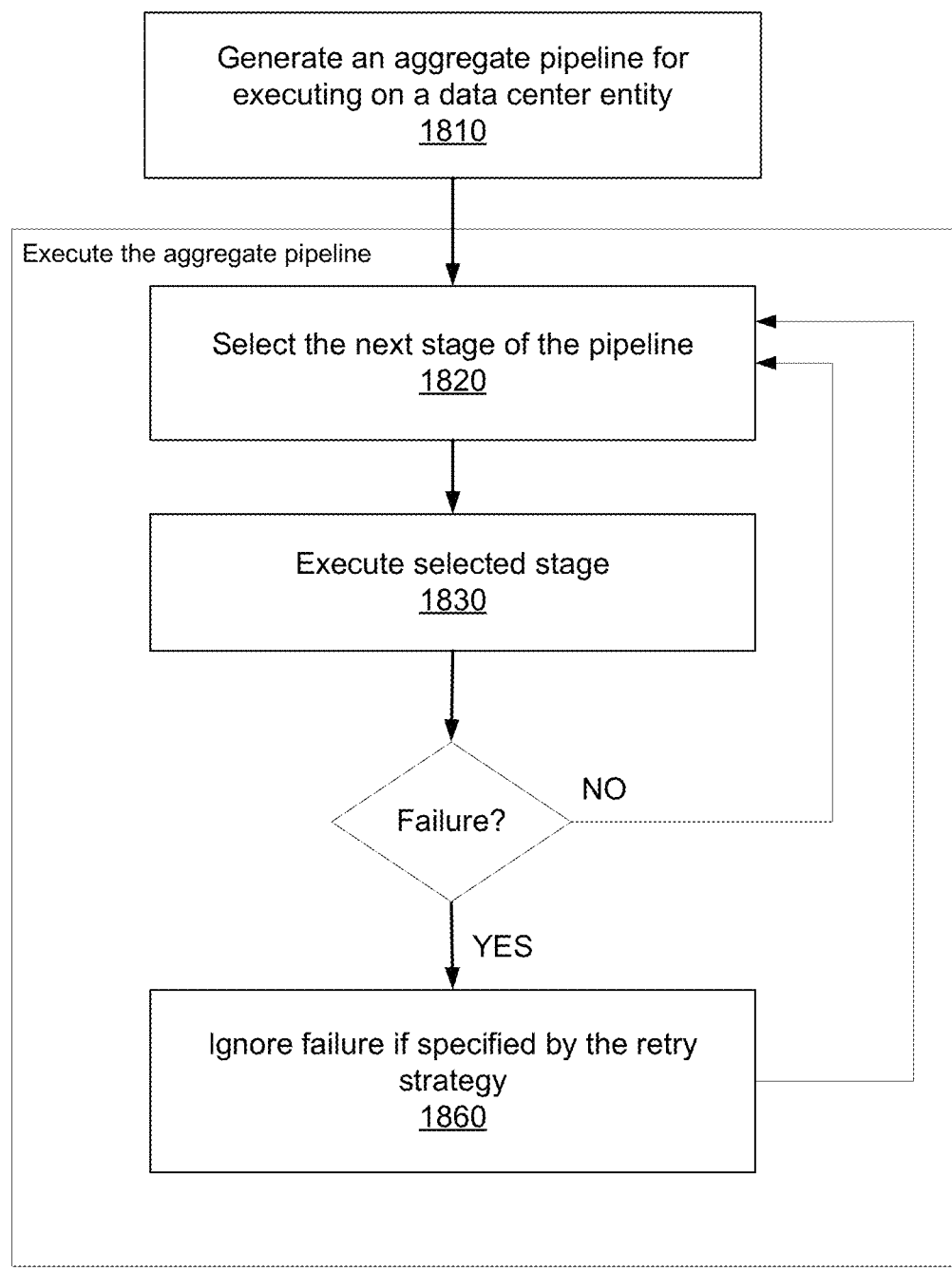

FIG. 18A-C shows various processes for implementing retry strategies during execution of a pipeline according to an embodiment. The system generates 1810 the aggregate pipeline for executing on a data center entity. The system executes the stages of the pipeline by executing the corresponding pipelines of data center entities below the data center entity in the hierarchy.

The execution of the stages of the aggregate pipeline comprises following steps. The system selects 1820 the next stage of the pipeline for execution, proceeding in the order in which the stages are arranged in the sequence of the pipeline. The system executes 1830 the selected stage. The system checks 1840 if the execution of the stage encounters a failure. If there is no failure, the system proceeds to select 1820 the next stage for execution. If the system encounters a failure during execution of the selected stage of the aggregate pipeline, the system determines whether a retry strategy is applicable for the data center entity for which the aggregate pipeline is defined. The system invokes any applicable retry strategy.

In the process 1800A shown in FIG. 18A, the retry strategy species repeated execution 1850 of the stage. Accordingly, the system repeats the execution of the stage one or more times as specified by the retry strategy. The retry strategy may specify the number of times the stage should be retried. The retry strategy may specify an amount of delay between subsequent executions. Accordingly, the system waits for the specified amount of delay before executing the stage a subsequent time. The system may specify a fixed sized delay between subsequent executions. Alternatively, the system may specify a variable size delay between executions, for example, an increasing size delay between subsequent executions.

In the process 1800B shown in FIG. 18B, the stages 1810, 1820, 1830, and 1840 are executed similar to the process shown in FIG. 18A. However, the retry strategy specifies that if a failure is encountered in a stage, the execution of the pipeline is paused for a specified amount of delay. The system may optionally send an alert to one or more users as specified in the retry strategy. The execution of the pipeline is paused to allow a remedial action to be performed. For example, a system administrator may perform manual intervention and take actions to diagnose and fix errors. The delay specified in the retry strategy may be indefinite such that a system administrator or a user needs to manually indicate that the execution should resume once the remedial action is completed.

FIG. 18C shows a process 1800C in which the system ignores 1860 the failure and continues execution with the next stage. Such a strategy is used if the system can proceed in view of failures in the pipeline. The retry strategy may identify the types of failures for which this strategy applies. Accordingly, the system proceeds with the execution of the next stage if a failure belongs to a predefined set or category of failures.

In some embodiment, the system generates a retrier pipeline that acts as a wrapper around the aggregate pipeline generated for the data center entity. The retrier pipeline implements specific retry strategies.

Figure 19:
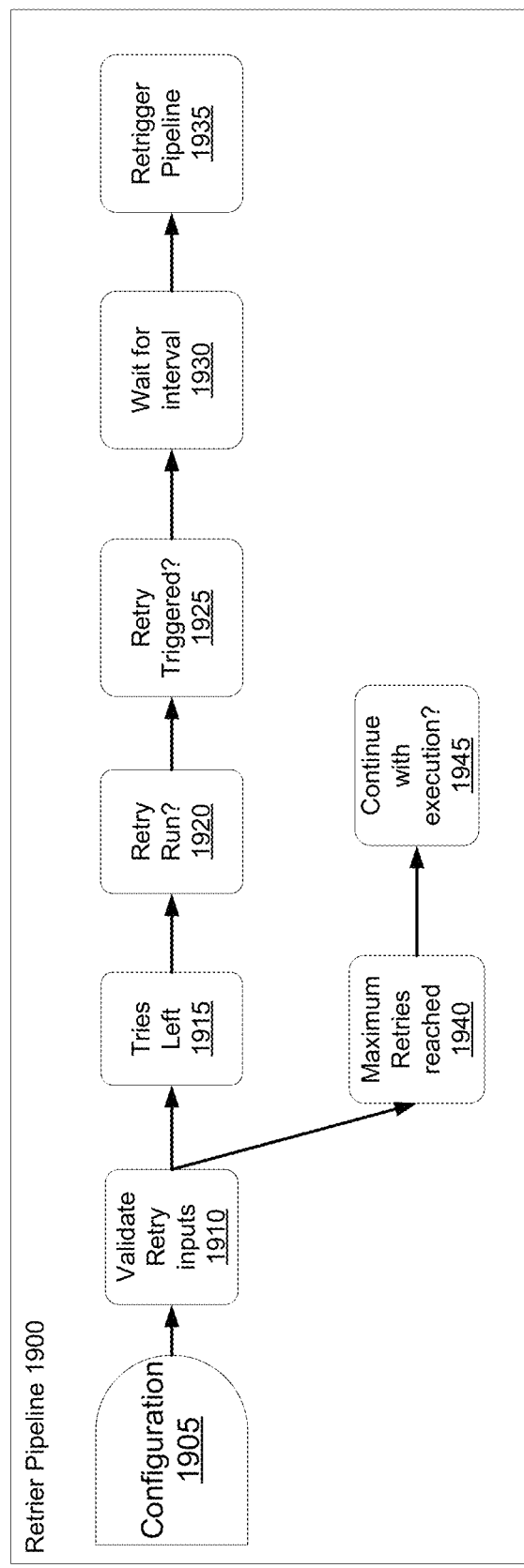
FIG. 19 shows an example retrier pipeline according to an embodiment.

FIG. 19 shows an example retrier pipeline 1900 according to an embodiment. The retrier pipeline includes following stages. The configuration 1905 stage represents the initialization of the retries pipeline. The validate retry input stage 1910 validates all the retry strategy related inputs provided by the wrapper pipeline when invoking this pipeline. The tries left stage 1915 checks if the maximum retry count is reached and determines whether to execute the retry branch of the pipeline accordingly.

The retry run stage 1920 represents a manual judgement stage that requests from a user if the user wants to retry the execution of the stage. This stage may present various options to users including (1) Proceed with the retry, (2) Proceed with failure, or (3) halt and fail with failure. The retry triggered stage 1925 determines if retry should be invoked or not based on the selection in the retry run manual judgement stage 1920. The wait for interval stage 1930 waits (or delays execution) for a specified amount of time interval as specified in the retry strategy configuration, before retrying the pipeline.

The amount of delay specified may be a fixed sized time interval for fixed timeout retry strategies. Alternatively, the amount of delay may be variable, for example, exponentially increasing time delay for an exponential backoff retry strategy. The retrier pipeline stage 1935 invokes the aggregate pipeline again with the same parameters as the initial invocation. The maximum retries reached stage 1940 determines if max number of retries have been reached for the aggregate pipeline. The continue with execution stage 1945 performs manual judgement to ask users if they want to continue with the pipeline execution if maximum retries have been reached for the execution of the pipeline.

The ability to retry execution of a stage uses the implementation of idempotency to perform efficient implementation of the retry strategies. Since retrying execution of a stage of an aggregate pipeline may require repeated execution of various pipelines represented by the stage, idempotency ensures that stages of these pipelines that successfully completed execution previously are not executed again. This ensures efficient repeated execution of the pipelines.

Computer Architecture

Figure 20:
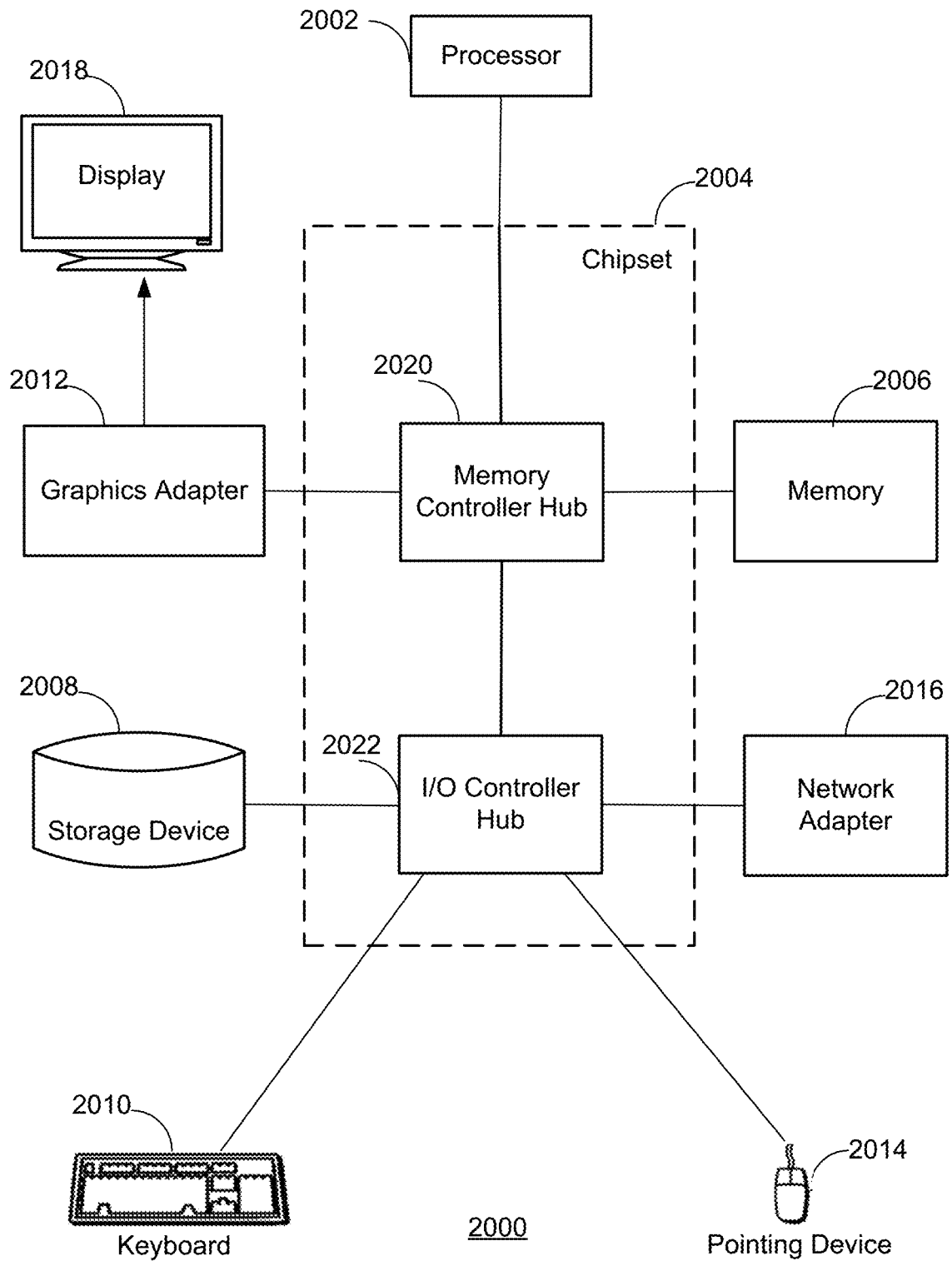
FIG. 20 is a block diagram illustrating a functional view of a typical computer system for use in the environment of FIG. 1 according to one embodiment.

FIG. 20 is a high-level block diagram illustrating a functional view of a typical computer system for use as one of the entities illustrated in the environment 100 of FIG. 1 according to an embodiment. Illustrated are at least one processor 2002 coupled to a chipset 2004. Also coupled to the chipset 2004 are a memory 2006, a storage device 2008, a keyboard 2010, a graphics adapter 2012, a pointing device 2014, and a network adapter 2016. A display 2018 is coupled to the graphics adapter 2012. In one embodiment, the functionality of the chipset 2004 is provided by a memory controller hub 2020 and an I/O controller hub 2022. In another embodiment, the memory 2006 is coupled directly to the processor 2002 instead of the chipset 2004.

The storage device 2008 is a non-transitory computer-readable storage medium, such as a hard drive, compact disk read-only memory (CD-ROM), DVD, or a solid-state memory device. The memory 2006 holds instructions and data used by the processor 2002. The pointing device 2014 may be a mouse, track ball, or other type of pointing device, and is used in combination with the keyboard 2010 to input data into the computer system 200. The graphics adapter 2012 displays images and other information on the display 2018. The network adapter 2016 couples the computer system 2000 to a network.

As is known in the art, a computer 2000 can have different and/or other components than those shown in FIG. 20. In addition, the computer 2000 can lack certain illustrated components. For example, a computer system 2000 acting as a multi-tenant system 110 may lack a keyboard 2010 and a pointing device 2014. Moreover, the storage device 2008 can be local and/or remote from the computer 2000 (such as embodied within a storage area network (SAN)).

The computer 2000 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 2008, loaded into the memory 2006, and executed by the processor 2002.

The types of computer systems 2000 used by the entities of a system environment can vary depending upon the embodiment and the processing power used by the entity. For example, a client device may be a mobile phone with limited processing power, a small display 2018, and may lack a pointing device 2014. A multi-tenant system or a cloud platform, in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

What is claimed is:

1. A computer implemented method for managing execution of a pipeline for deploying software artifacts on a cloud platform, the method comprising:
  receiving a pipeline configured to deploy a software artifact on a cloud platform, the pipeline comprising a plurality of stages;
  accessing a state store describing a previous execution of the pipeline, the state store mapping a context for a stage to an execution status of the stage, the context representing inputs of the stage and the execution status indicating whether the stage successfully executed in the previous execution of the pipeline; and executing a subset of the plurality of stages for a subsequent execution of the pipeline, comprising:
  selecting a stage;
  determining a context for the stage based on inputs of the stage for the subsequent execution of the pipeline;
  accessing an execution status of the stage from the state store;
  determining based on the execution status of the stage, whether to select the stage as a candidate stage for the subsequent execution of the pipeline or whether to skip the stage during the subsequent execution of the pipeline; and
  executing the stage responsive to selecting the stage as a candidate stage for the subsequent execution of the pipeline.

2. The computer implemented method of claim 1, wherein the software artifact is being deployed on a data center configured on the cloud platform, the data center comprising a hierarchy of data center entities, wherein the pipeline is an aggregate pipeline for a data center entity, wherein the execution status of the stage for the data center entity is determined as an aggregate value based on the execution status of data center entities below the data center entity in the hierarchy.

3. The computer implemented method of claim 1, further comprising:
  generating a hash value based on attributes describing a stage, wherein the state store maps the hash value for the stage to the execution status of the stage.

4. The computer implemented method of claim 1, the method comprising:
  responsive to determining that the execution status of the stage for the context indicates a successful execution of the stage, skipping execution of the stage for the subsequent execution of the pipeline.

5. The computer implemented method of claim 1, the method comprising:
  responsive to determining that the execution status of the stage for the context fails to indicate a successful execution of the stage, marking the stage as a candidate stage for the subsequent execution of the pipeline.

6. The computer implemented method of claim 1, wherein the context for the stage is determined based on attributes describing a deployment manifest.

7. The computer implemented method of claim 1, wherein the context for the stage is determined based on an artifact version for an artifact being deployed by the pipeline.

8. The computer implemented method of claim 1, wherein the context for the stage is determined based on a version of a deployment manifest used by the pipeline.

9. The computer implemented method of claim 1, wherein a software artifact comprises one of: a file storing executable instructions, a deployment manifest file, or a cloud platform image.

10. The computer implemented method of claim 1, the method comprising:
  generating the pipeline such that the pipeline includes a pipeline controller stage configured to execute a subset of stages of the pipeline by skipping execution of one or more stages as specified in an artifact version map.

11. The computer implemented method of claim 10, wherein the pipeline controller stage is further configured to check execution status of a stage in previous executions of the pipeline and determine whether to skip execution of the stage in the subsequent execution of the pipeline.

12. The computer implemented method of claim 1, wherein the pipeline further includes a pipeline closing stage configured to store in the state store, the execution status of stages that executed in an execution of the pipeline.

13. A non-transitory computer readable storage medium for storing instructions that when executed by a computer processor cause the computer processor to perform steps for managing execution of a pipeline for deploying software artifacts on a cloud platform, the steps comprising:
  receiving a pipeline configured to deploy a software artifact on a cloud platform, the pipeline comprising a plurality of stages;
  accessing a state store describing a previous execution of the pipeline, the state store mapping a context for a stage to an execution status of the stage, the context representing inputs of the stage and the execution status indicating whether the stage successfully executed in the previous execution of the pipeline; and
  executing a subset of the plurality of stages for a subsequent execution of the pipeline, comprising:
    selecting a stage;
    determining a context for the stage based on inputs of the stage for the subsequent execution of the pipeline;
    accessing an execution status of the stage from the state store;
    determining based on the execution status of the stage, whether to select the stage as a candidate stage for the subsequent execution of the pipeline or whether to skip the stage during the subsequent execution of the pipeline; and
    executing the stage responsive to selecting the stage as a candidate stage for the subsequent execution of the pipeline.

14. The non-transitory computer readable storage medium of claim 13, wherein the software artifact is being deployed on a data center configured on the cloud platform, the data center comprising a hierarchy of data center entities, wherein the pipeline is an aggregate pipeline for a data center entity, wherein the execution status of the stage for the data center entity is determined as an aggregate value based on the execution status of data center entities below the data center entity in the hierarchy.

15. The non-transitory computer readable storage medium of claim 13, wherein the instructions further cause the computer processor to perform steps comprising:
  responsive to determining that the execution status of the stage for the context indicates a successful execution of the stage, skipping execution of the stage for the subsequent execution of the pipeline.

16. The non-transitory computer readable storage medium of claim 13, wherein the instructions further cause the computer processor to perform steps comprising:
  responsive to determining that the execution status of the stage for the context fails to indicate a successful execution of the stage, marking the stage as a candidate stage for subsequent execution of the pipeline.

17. The non-transitory computer readable storage medium of claim 13, wherein the context for the stage is determined based on attributes describing one or more of: an artifact version for an artifact being deployed by the pipeline, or a version of a deployment manifest used by the pipeline.

18. The non-transitory computer readable storage medium of claim 13, wherein the instructions further cause the computer processor to perform steps comprising:
  generating the pipeline such that the pipeline includes a pipeline controller stage configured to execute a subset of stages of the pipeline by skipping execution of one or more stages as specified in an artifact version map, the pipeline controller stage further configured to check execution status of a stage in previous executions of the pipeline and determine whether to skip execution of the stage in the subsequent execution of the pipeline.

19. The non-transitory computer readable storage medium of claim 13, wherein the pipeline further includes a pipeline closing stage configured to store in the state store, the execution status of stages that executed in an execution of the pipeline.

\* \* \* \* \*